(12) United States Patent
Kinoshita

(10) Patent No.: US 7,577,976 B2
(45) Date of Patent: Aug. 18, 2009

(54) SUPPORT SERVER, SUPPORT METHOD, AND PROGRAM FOR DETERMINING PROVIDING ROUTE OF CONTENT

(75) Inventor: Haruhiko Kinoshita, Tokyo (JP)

(73) Assignee: NEC Corporation, Tokyo (JP)

( * ) Notice: Subject to any disclaimer, the term of this patent is extended or adjusted under 35 U.S.C. 154(b) by 1181 days.

(21) Appl. No.: 10/670,511

(22) Filed: Sep. 26, 2003

(65) Prior Publication Data

US 2004/0068581 A1   Apr. 8, 2004

(30) Foreign Application Priority Data

Sep. 27, 2002   (JP)   ............... 2002-282699

(51) Int. Cl.
   *H04N 7/173*   (2006.01)
(52) U.S. Cl. ............ 725/105; 709/244; 705/14; 725/82; 725/32; 725/36; 725/42; 725/113; 725/114; 725/109; 725/110; 725/112; 725/74
(58) Field of Classification Search ........ 725/105, 725/84; 709/14, 203; 705/14, 27
See application file for complete search history.

(56) References Cited

U.S. PATENT DOCUMENTS

| | | | |
|---|---|---|---|
| 5,940,812 A | | 8/1999 | Tengel et al. |
| 2001/0052001 A1* | | 12/2001 | Stern .................. 709/219 |
| 2002/0069107 A1* | | 6/2002 | Werner ................ 705/14 |
| 2002/0138832 A1* | | 9/2002 | Svoboda .............. 725/36 |
| 2003/0013436 A1* | | 1/2003 | Son .................... 455/414 |
| 2007/0016488 A1* | | 1/2007 | Ulenas ................ 705/26 |

FOREIGN PATENT DOCUMENTS

| | | |
|---|---|---|
| JP | 2002-32670 A | 1/2002 |
| JP | 2002-56137 A | 2/2002 |
| JP | 2002-74160 A | 3/2002 |
| JP | 2002-118834 A | 4/2002 |
| JP | 2002-171471 A | 6/2002 |
| JP | 2002-215622 A | 8/2002 |
| JP | 2002-251536 A | 9/2002 |

OTHER PUBLICATIONS

Kubler et al., U.S. Appl. No. 60/356,827, filed Feb. 2002 (incorporated by reference via Kubler et al. US Pat Pub 2004/0158865).*

* cited by examiner

*Primary Examiner*—Scott Beliveau
*Assistant Examiner*—Alan Luong
(74) *Attorney, Agent, or Firm*—Sughrue Mion, PLLC

(57) ABSTRACT

A support server receives via a communication network, facility condition information provided by a content providing terminal that provides a content, showing the condition of the facility where a content is used, and facility information provided by a content user terminal, which is set in the facility where the content is used. The support server stores the received facility condition information and the facility information in a database. The support server extracts facility information that meets the condition shown by the stored facility condition information, from the stored facility information. Then, the support server selects the content user terminal set in the facility specified by the extracted facility information, as the providing destination of the content.

21 Claims, 16 Drawing Sheets

SUPPORT SERVER, SUPPORT METHOD, AND PROGRAM FOR DETERMINING PROVIDING ROUTE OF CONTENT

BACKGROUND OF THE INVENTION

1. Field of the Invention

The present invention relates to a support server, support method, and a program for supporting determination of a providing route of a content, provided via a communication network.

2. Description of the Related Art

Conventionally, when a film is created by a film creator, a distribution film is distributed to the movie theaters that run the film. Concretely, the film creator creates a master film by shooting and editing. Then, the film creator creates the necessary number of edited films from the master film, and sends the edited film to the distributing agency. The distributing agency creates a large quantity of distribution film from the received edited film, and distributes the distribution film to the movie theaters. When the running period of the film ends, the distributed film is returned from the movie theater.

By the above distribution method, there is a need to create a large quantity of distribution film, and the distribution film needs to be distributed and collected. Consequently, a lot of time is necessary, and a high cost is required.

As disclosed in the Unexamined Japanese Patent Application KOKAI Publication No.2002-118834, and Unexamined Japanese Patent Application KOKAI Publication No.2002-171471, lately, a system for distributing films as film data in the form of electronic data, to distributing agencies and movie theaters via a communication network, instead of physical film, is proposed.

Even if film data is distributed via a communication network, there is a need to determine in advance, which distributing agency distributes the film data to which movie theater.

However, a system for determining (selecting) a distribution route of film data, does not exist. Therefore, the distribution route must be determined according to each film, by negotiation among the film creator, distributing agency, and the manager of the movie theater. Even if film data is distributed instead of films, there is a problem that the bothersome operation of determining the distribution route of the film data, is not resolved.

Additionally, the number of people who participate in the negotiation for determining the distribution route, is limited. Therefore, there is a problem that it is difficult to determine an adequate distribution route for respectively providing success to the film creator, the distributing agency, and the manager of the movie theater.

The same problems occur when distributing other contents, such as image data and moving image data to a user (for example an agency that carries out some kind of event using a content at a pubic hall or a concert hall), via a communication network The content of the above Unexamined Japanese Patent Applications are incorporate herein by reference in their entirety.

SUMMARY OF THE INVENTION

Therefore, an object of the present invention is to provide a support server, support method, and a program for determining a distribution route of a content, easily and adequately.

Another object of the present invention is to provide a support server, support method, and a program for lessening operation burden to determine a distribution route of a content To achieve the above objects, a support server according to a first aspect of the present application, supports determination of a providing route of a content, provided via a communication network, from a content providing terminal that provides a content, to a content user terminal placed in a facility where the content is to be used, comprising:

a receiving unit that receives facility condition information, showing a condition of a facility where the content is to be used, provided by the content providing terminal and facility information provided by the content user terminal, via the communication network;

a storing unit that stores the facility condition information and the facility information, received by the receiving unit; and a providing destination selecting unit that extracts facility information that meets the condition shown by the facility condition information, from the facility information stored in the storing unit, and selects a content user terminal placed at a facility specified by the extracted facility information, as the providing destination of the content.

The receiving unit may receive advertising agent condition information, provided by the content providing terminal, showing a condition of an advertising agent to request advertisement of the content, and advertising agent information, provided by advertising agent terminals managed by the advertising agents that advertise contents, showing advertisement ability of the advertising agents, the storing unit may store the advertising agent condition information and the advertising agent information, which the receiving unit received; and the support server may further comprise an advertising agent selecting unit, which extracts advertising agent information that meets the condition shown by the advertising agent condition information, from the advertising agent information stored in the storing unit, and selects an advertising agent specified by the extracted advertising agent information, as the advertising agent to request advertisement of the content.

The content may be film data used for running a film.

A support server according to a second aspect of the present invention, supports determination of a providing route of a content, provided via a communication network, from a content providing terminal that provides a content to a content user terminal, placed in a facility where the content is to be used, comprising:

a receiving unit that receives content information, provided by content providing terminals and content condition information showing a condition of a content that is to be an advertising target, provided by the advertising agent terminal managed by an advertising agent that advertises a content, via the communication network;

a storing unit that stores the content information and the content condition information, received by the receiving unit; and an advertisement target content selecting unit that extracts content information that meets the condition shown by the content condition information, from the content information stored in the storing unit, and selects a content specified by the extracted content information, as the content to be advertised by the advertising agent.

The receiving unit may receive facility condition information, provided by the advertising agent terminal, showing a condition of a facility where the advertised content is used, and facility information, provided by content user terminals;

the storing unit may store the facility condition information and the facility information, which the receiving unit received; and the support server may further comprise a providing destination selecting unit, which extracts facility information that meets the condition shown by the facility condition information, from the facility information stored in the storing unit, and selects a content user terminal, placed at a facility specified by the extracted facility information, as the providing destination of the content that the advertising agent advertises.

The content may be film data used for running a film.

A support server according to a third aspect of the present invention, supports determination of a providing route of a content, provided via a communication network, from a content providing terminal that provides a content to a content user terminal, placed in a facility where the content is to be used, comprising:

a receiving unit that receives content information, provided by content providing terminals and content condition information, provided by the content user terminal showing a condition of the content that is to be a target to be used in the facility, via the communication network;

a storing unit that stores the content condition information and the content information, received by the receiving unit; and a providing content selecting unit that extracts content information that meets the condition shown by the content condition information, from the content information stored in the storing unit, and selects a content specified by the extracted content information, as the content to provide to the content user terminal.

The receiving unit may receive advertising agent condition information, provided by the content user terminal, showing a condition of advertising agent to request advertisement of the content, and advertising agent information showing the advertising ability of the advertising agent, provided by advertising agent terminals managed by advertising agents that advertise contents;

the storing unit may store the advertising agent condition information and the advertising agent information, which the receiving unit received; and the support server may further comprises an advertising agent selecting unit, which extracts advertising agent information that meets the condition shown by the advertising agent condition information, from the advertising agent information stored in the storing unit, and selects an advertising agent specified by the extracted advertising agent information, as the advertising agent to request advertisement of the content that is to be used in the facility.

The content may be film data used for running a film.

A support method according to a fourth aspect of the present invention, supports determination of a providing route of a content, provided via a communication network, from a content providing terminal that provides a content to a content user terminal, placed in a facility where the content is to be used, comprising:

receiving the facility condition information showing a condition of the facility where the content is to be used, provided by the content providing terminal, and facility information provided by the content user terminals, via the communication network;

storing the facility condition information and the facility information received in the receiving; and extracting facility information that meets the condition shown by the facility condition information, from the facility information stored in the storing, and selecting a content user terminal placed in a facility specified by the extracted facility information, as the providing destination of the content.

The receiving may comprise receiving advertising agent condition information, showing a condition of an advertising agent to request advertisement of the content, provided by the content providing terminal and advertising agent information showing the advertising ability of advertising agents, provided by the advertising agent terminals managed by the advertising agents, which are to advertise the content;

the storing may comprise storing the advertising agent condition information and the advertising information, received in the receiving; and the support method may further comprise extracting advertising agent information that meets the condition shown by the advertising agent condition information, from the advertising agent information stored in the storing, and selecting an advertising agent specified by the extracted advertising information, as the advertising agent to request advertisement of the content.

A support method according to a fifth aspect of the present invention, supports determination of a providing route of a content, provided via a communication network, from a content providing terminal that provides a content to a content user terminals, placed in a facility where the content is to be used, comprising:

receiving content information provided by the content providing terminals and content condition information showing a condition of the content to be the advertising target, provided by an advertising agent terminal managed by an advertising agent that is to advertise a content;

storing the content information and the content condition information, received in the receiving; and extracting content information that meets the condition shown by the content condition information, from the content information stored in the storing, and selecting a content specified by the extracted content information, as the content to be advertised by the advertising agent.

The receiving may comprise receiving facility condition information showing a condition of the facility to use the content to be advertised, provided by the advertising agent terminal and facility information provided by content terminals, which are placed in facilities where a content is to be used;

the storing may comprise storing the facility condition information and the facility information received in the receiving; and the support method may further comprise extracting facility information that meets the condition shown by the facility condition information, from the facility information stored in the storing, and selecting a content user terminal placed in a facility specified by the extracted facility information, as the providing destination of the content that is to be advertised by the advertising agent.

A support method according to a sixth aspect of the present invention, supports determination of a providing route of a content, provided via a communication network, from a content providing terminal that provides a content to a content user terminal, placed in a facility where the content is to be used, comprising:

receiving content information provided by content providing terminals and content condition information showing a condition of a content that is a target to be used in the facility, provided by the content user terminal, via the communication network;

storing the content information and the content condition information received in the receiving; and extracting content information that meets the condition shown by the content condition information, from the content information stored in the storing, and selecting a content, specified by the extracted content information, as the content to be provided to the content user terminal.

The receiving may comprise receiving advertising agent condition information showing a condition of an advertising agent to request advertisement of the content, provided by the content user terminal and advertising agent information showing the advertisement ability of the advertising agents, provided by the advertising agent terminals managed by the advertising agents that advertise contents;

the storing may comprise storing the advertising agent condition information and the advertising agent information received in the receiving; and the support method may further comprise extracting advertising agent information that meets the condition shown by the advertising agent condition information, from the advertising agent information stored in the storing, and selecting an advertising agent specified by the extracted advertising agent information, as the advertising agent to request advertisement of the content that is to be used in the facility.

A support program according to a seventh aspect of the present invention, supports determination of a providing route of a content, provided via a communication network, from a content providing terminal that provides a content to a content user terminal, placed in a facility where the content is to be used, and controls a computer to execute:

receiving the facility condition information that shows a condition of the facility, which the content is used, provided by the content providing terminal and content facility information provided by the content user terminals, via the communication network;

storing the facility condition information and the facility information received in the receiving; and extracting facility information that meets the condition shown by the facility condition information, from the facility information stored in the storing, and selecting the content user terminal placed in a facility specified by the extracted facility information, as the providing destination of the content that the advertising agent advertises.

A support program according to an eighth aspect of the present invention, supports determination of a providing route of a content, provided via a communication network, from a content providing terminal that provides a content to a content user terminal, placed in a facility where the content is to be used, and controls a computer to execute:

receiving content information provided by the content providing terminals and content condition information showing a condition of the content to be an advertising target, provided by an advertising agent terminal managed by an advertising agent that advertises a content;

storing the content information and the content condition information received in the receiving; and extracting content information that meets the condition shown by the content condition information, from the content information stored in the storing, and selecting the content specified by the extracted content information, as the content that the advertising agent advertises.

A support program according to a ninth aspect of the present invention, supports determination of a providing route of a content, provided via a communication network, from a content providing terminal that provides a content to a content user terminal, placed in a facility where the content is to be used, and controls a computer to execute:

receiving the content information provided by the content providing terminals and content condition information showing a condition of a content that is a target, used in the facility, provided by the content user terminal, via the communication network;

storing the content information and the content condition information received in the receiving; and extracting content information that meets the condition shown by the content condition information, from the content information stored in the storing, and selecting a content specified by the extracted content information, as the content to provide to the content user terminal.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

A support system for determining a route to distribute a content, according to the first embodiment of the present invention, will be described with reference to the drawings.

Figure 1:
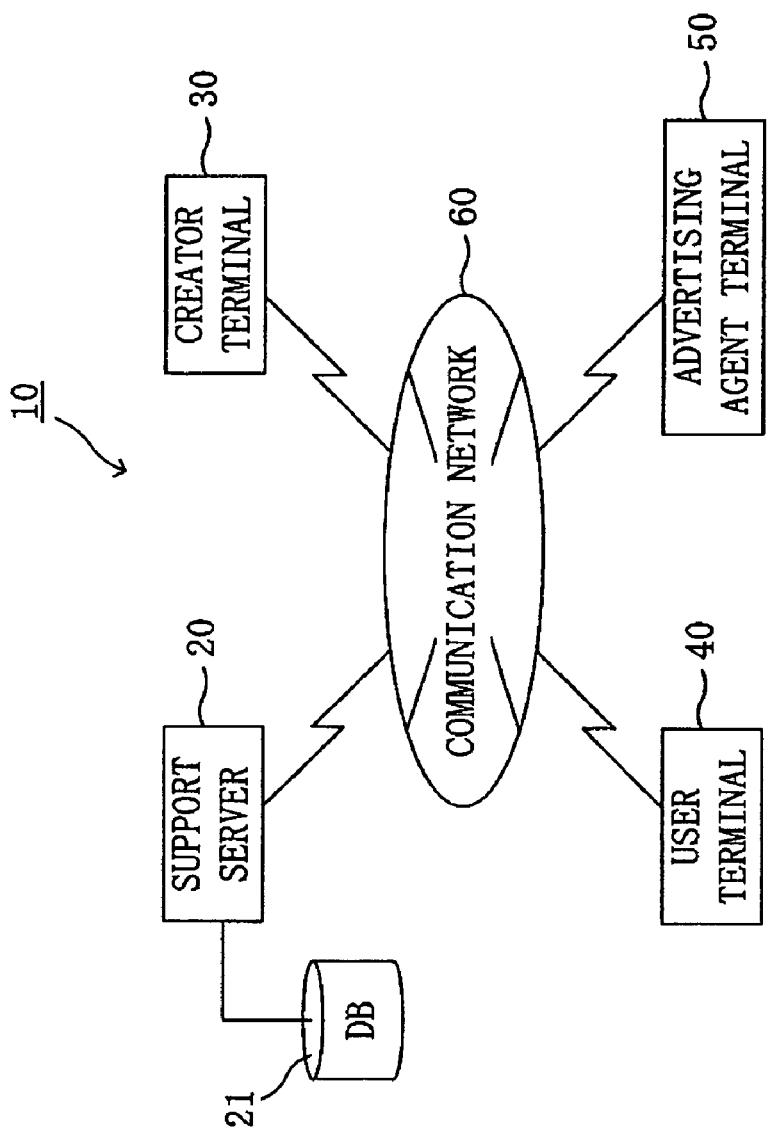
FIG. 1 shows a structure of a support system according to the first embodiment.

FIG. 1 is a block diagram showing an example of a structure of a support system 10, according to the first embodiment of the present invention. The support system 10, comprises a support server 20, a creator terminal 30, a user terminal 40, and an advertising agent terminal 50. The support server 20, the creator terminal 30, the user terminal 40, and the advertising agent terminal 50 are connected to a communication network 60, such as the Internet, and communicates respectively, via the communication network 60.

In FIG. 1, one creator terminal 30, one user terminal 40, and one advertising agent terminal 50, is shown as an example. However, the creator terminal 30, the user terminal 40, and the advertising agent terminal 50, may be plurally provided.

In this embodiment an example of a case where a distributed content is movie data for running a film, will be described. The movie data may be data obtained by changing an image, such as a film applied in shooting, to electronic data, or may be data directly obtained as electronic data, in a case of a shooting by a digital video camera and the like. Additionally, the image may be any image, such as live-action, animation, or computer graphics.

The support server 20 is comprised of an information processing device, such as an Internet server, and is managed by a system manager who manages the support system 10. The support server 20 functions as a WWW (World Wide Web) server, and manages Web pages. The Web page that the support server manages, includes a Web site for receiving registering, and changing of various information, which will be later described. The support server 20 includes a function for determining a distribution destination of a content.

Furthermore, the support server 20 comprises a database 21 for storing various information. Information stored in the database 21, include information obtained from a content creator, information obtained from a content user, and information obtained from an advertising agent, etc.

The creator terminal 30, the user terminal 40, and the advertising agent terminal 50, are respectively comprised of an information processing device, such as a personal computer. The creator terminal 30, the user terminal 40, and the advertising agent terminal 50, respectively comprise an environment (hardware, software, etc. for connecting to the communication network 60, and sending and receiving information via the communication network 60.

The creator terminal 30 is managed by a creator who creates a content, and provides the created content. For example, a film producer, and a film making company, etc., falls in the category of the content creator.

The user terminal 40 is placed in a facility (for example a movie theater), where the content is used, and is managed by a content user who releases the content to the public. For example, a manager of a movie theater that runs a movie, etc., falls in the category of the content user.

The advertising agent terminal 50 is managed by an advertising agent that advertises the content. The so-called distributing agency that advertises for example movies, falls in the category of the advertising agent.

Next, the operation of the support system 10 of the present embodiment, will be described with reference to the drawings.

Figure 2:
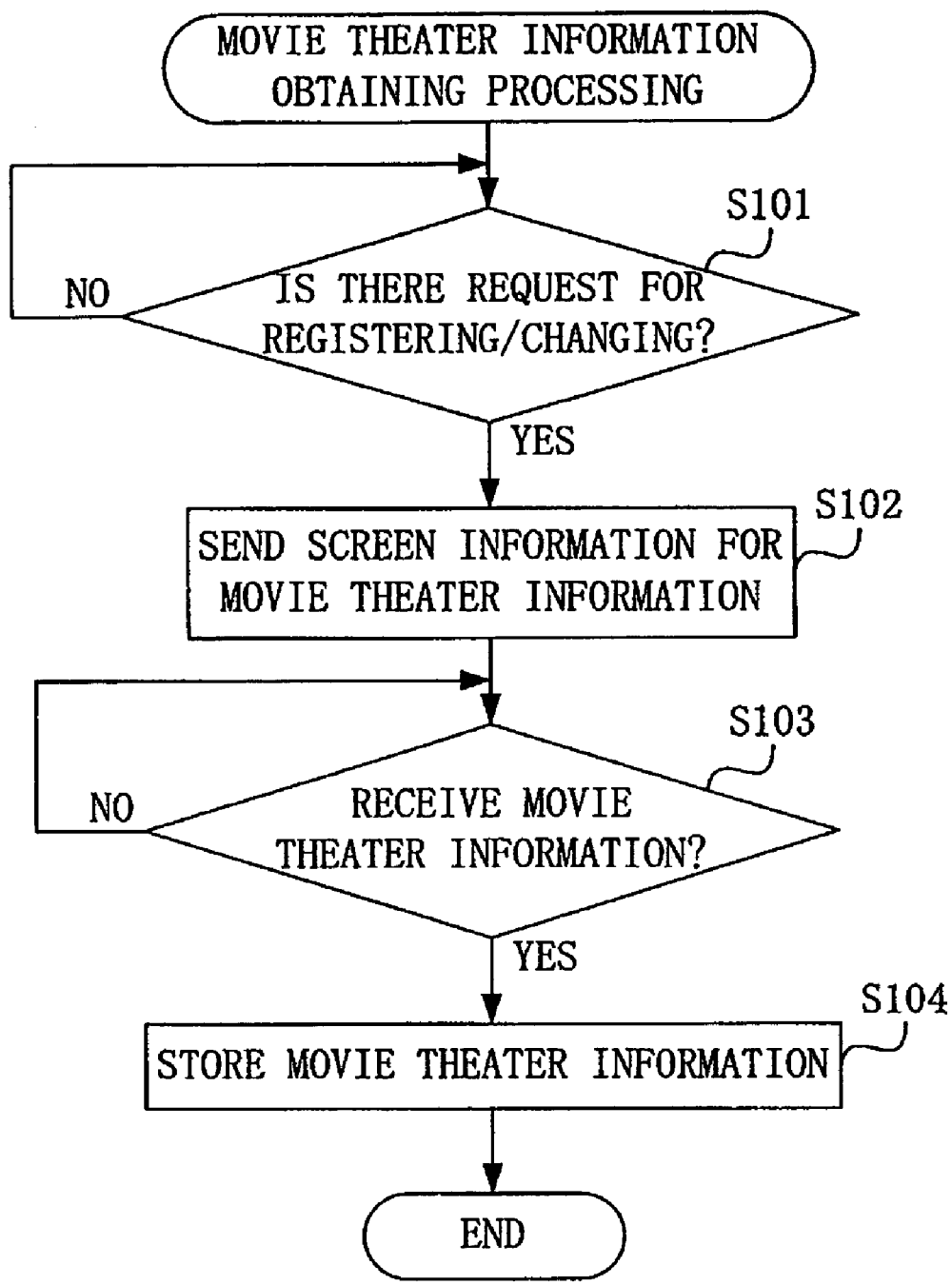
FIG. 2 is a flowchart showing a processing for obtaining movie theater information, performed by a support server comprising the support system of FIG. 1.

FIG. 2 is a flow chart showing an example of a processing for obtaining movie theater information from the content user (manager of the movie theater).

Below, an example where the support system server 20 obtains movie theater information, which will be described later, from a manager of a movie theater A, who manages the user terminal 40, and stores the obtained movie theater information to the database 21. It is assumed that the manager of the movie theater A, carries out a user registration to the support server 20, applying the user terminal 40, and obtains a user ID, and password, beforehand.

First, the support server 20 requests for the input of a user ID, and password, in response to an access request from the user terminal 40. The access request is made by for example, the manager of the movie theater A, operating the user terminal 40, and designating a URL (Uniform Resource Locator) of the support server 20.

The support server 20 performs authentication processing using the user ID, and password, input in response to the request. In a case where the manager of the movie theater is authenticated as the correct user, the support system server 20 allows access from the user terminal 40.

The user terminal 40 performs a registering request, or a changing request of movie theater information to the support server 20, following the operation of the manager of the movie theater A, in a case where access to the support server 20 is permitted. Here, a registering request is performed in a case where movie theater information is registered for the first time, and changing request is performed in a case where movie theater information is already registered.

After permitting access, the support server 20 determines whether or not there is a registering request, or a changing request for the movie theater information, from the user terminal 40 (Step S101). In a case where the support server 20 determines that there is not either a registering request, nor a changing request (Step S101; NO), the support system server 20 returns the processing to Step S101, and waits for a registering request, or a changing request. On the other hand, in a case where the support server 20 determines that there is either a registering request, or a changing request (Step S101; YES), the support server 20 sends screen information, for displaying a screen, for inputting the movie theater information, to the user terminal 40 via the communication network 60 (Step S102).

Receiving screen information, the user terminal 40 displays a screen, on a display device that the user terminal 40 comprises, (for example, a liquid crystal display device) for inputting movie theater information, based on the received screen information.

Figure 3:
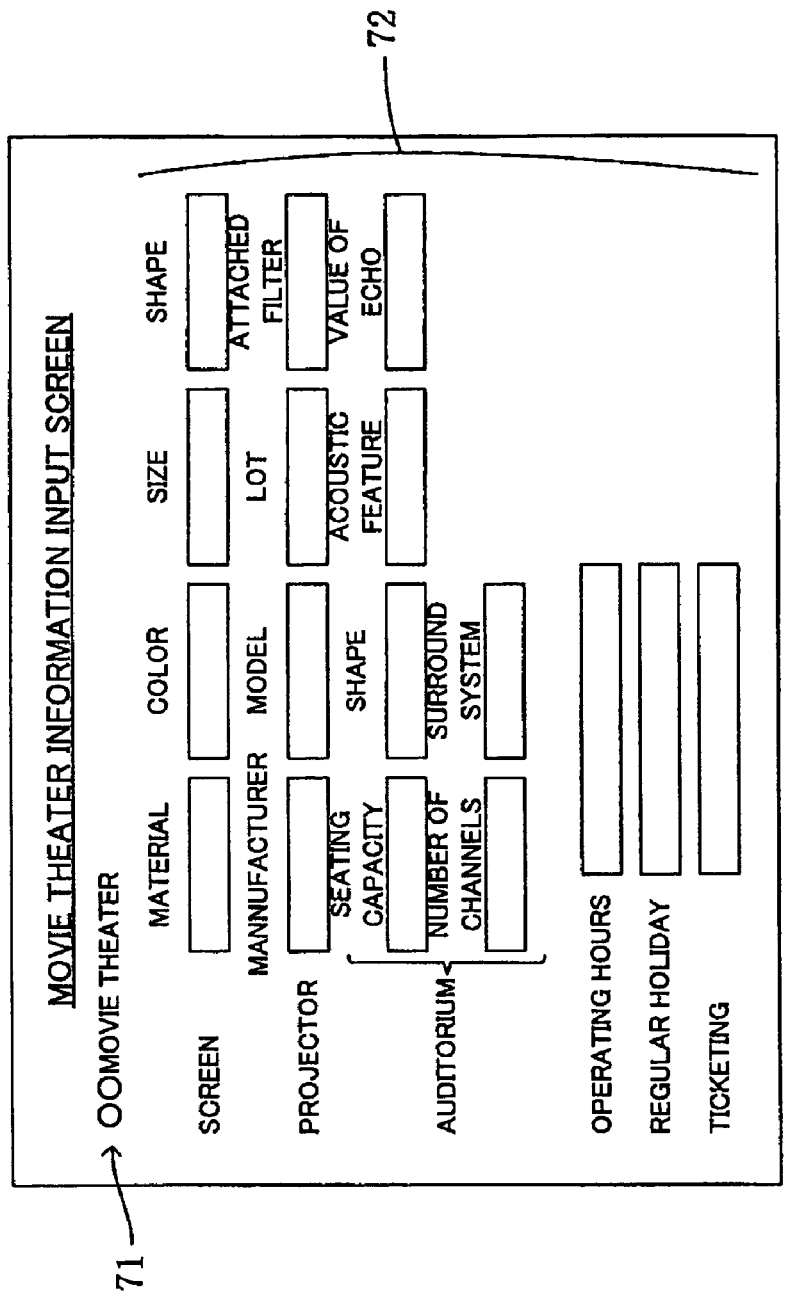
FIG. 3 shows a screen for inputting movie theater information displayed by a user terminal comprising the support system of FIG. 1.

FIG. 3 shows an example of a screen for inputting movie theater information. As shown in FIG. 3, in the screen for inputting movie theater information, display areas 71 for displaying the name of the movie theater, and input areas 72 for inputting other information concerning the movie theater are provided.

The movie theater information, as shown in FIG. 3, includes various information concerning the movie theater, such as, name of movie theater, information concerning screen, such as, material color, size, and shape, information concerning projector, such as, manufacturer, model, lot, and type of attached filter, information concerning auditorium, such as, seating capacity, shape, acoustic feature, value of echo, number of channels, and surround system, operating hours, regular holidays, and information concerning ticketing, such as average number of audience mobilization on weekdays, and average number of audience mobilization on holidays, and category of audience (for example, adult, student, children). The movie theater information shown in FIG. 3 is just one example. In the movie theater information, other information concerning the movie theater, such as for example, time distance from closest station, and period where there is no schedule of showing is included.

After the screen for inputting the movie theater information is displayed, the manager of the movie theater A inputs the movie theater information concerning the movie theater A that the manager manages himself/herself, to each input area 72, applying an input device (for example, a keyboard, a mouse), which the user terminal 40 comprises. The user terminal 40 sends the input movie theater information to the support server 20 via the communication network 60, according to the instructions of the manager, who completed input of the movie theater information.

In a case where the movie theater information is already registered, the information that is presently registered is displayed in the screen for inputting movie theater information. Therefore, by deleting or changing the information displayed in the input areas 72, change of movie theater information can be carried out.

The support server 20 determines whether or not to receive the movie theater information from the user terminal 40, after sending the screen information (Step S103). In a case where the support server 20 determines not to receive the movie theater information, (Step S103; NO), the support server 20 returns to the processing of Step S103, and waits for a movie theater information from the user terminal 40. On the other hand, in a case where the support server 20 determines to receive the movie theater information, (Step S103; YES), the support server 20 stores the received movie theater information to the database 21 (Step S104). By this, the support server 20 newly registers, or updates the movie theater information. After the movie theater information is stored in the database 21, the processing for obtaining the movie theater information is completed.

Figure 4:
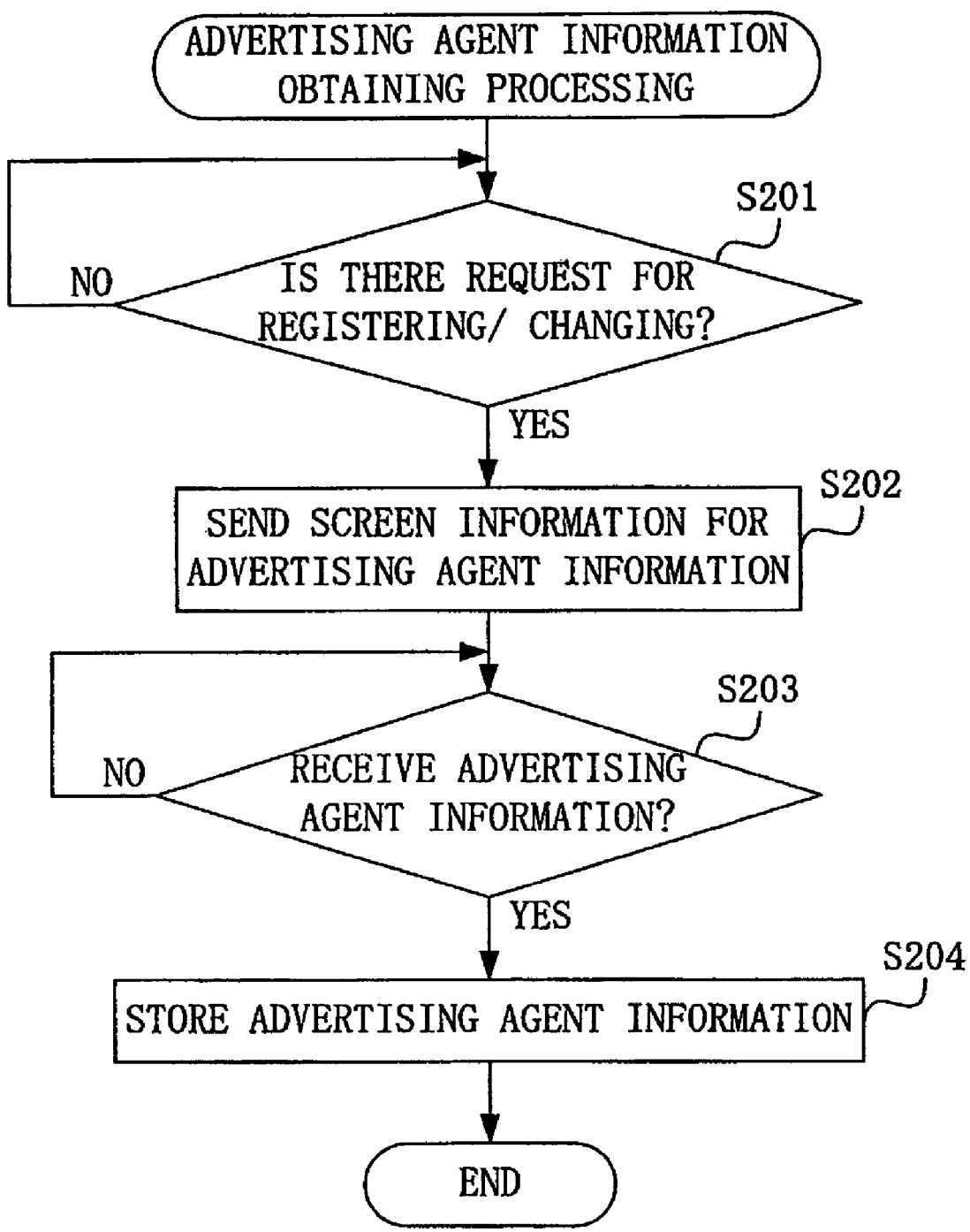
FIG. 4 is a flowchart showing a processing for obtaining advertising agent information, performed by the support server in the first embodiment.

FIG. 4 is a flow chart showing an example of a processing for obtaining advertising agent information from the advertising agent.

Below, an example where the support system server 20 obtains advertising agent information, which will be described later, from an advertising agent B that manages the advertising agent terminal 50, and stores the obtained advertising agent information to the database 21 will be described. It is assumed that the advertising agent B, carries out a user registration to the support server 20, applying the advertising agent terminal 50, and obtains a user ID, and password, beforehand.

First, the support server 20 requests for the input of a user ID, and password, in response to an access request from an advertising agent terminal 50. The access request is made by for example, a person responsible of the advertising agent B, operating the advertising agent terminal 50, and designating a URL (Uniform Resource Locator) of the support server 20.

The support server 20 performs authentication processing using the user ID, and password, input in response to the request. In a case where the advertising agent B is authenticated as the correct user, the support system server 20 allows access from the advertising agent terminal 50.

The advertising agent terminal 50 performs a registering request, or a changing request of advertising agent information, to the support server 20, following the operation of the person responsible of the advertising agent B, in a case where access to the support server 20 is permitted. Here, a registering request is performed in a case where advertising agent information is registered for the first time, and changing request is performed in a case where advertising agent information is already registered.

After permitting access, the support server 20 determines whether or not there is a registering request, or a changing request for the advertising agent information, from the advertising agent terminal 50 (Step S201). In a case where the support server 20 determines that there is not either a registering request, nor a changing request (Step S201; NO), the support system server 20 returns the processing to Step S201, and waits for a registering request, or a changing request. On the other hand, in a case where the support server 20 determines that there is either a registering request, or a changing request (Step S201; YES), the support server 20 sends screen information, for displaying a screen, for inputting the advertising agent information, to the advertising agent terminal 50 via the communication network 60 (Step S202).

Receiving screen information, the advertising agent terminal 50 displays a screen, on a display device that the advertising agent terminal 50 comprises, for inputting advertising agent information, based on the received screen information.

Figure 5:
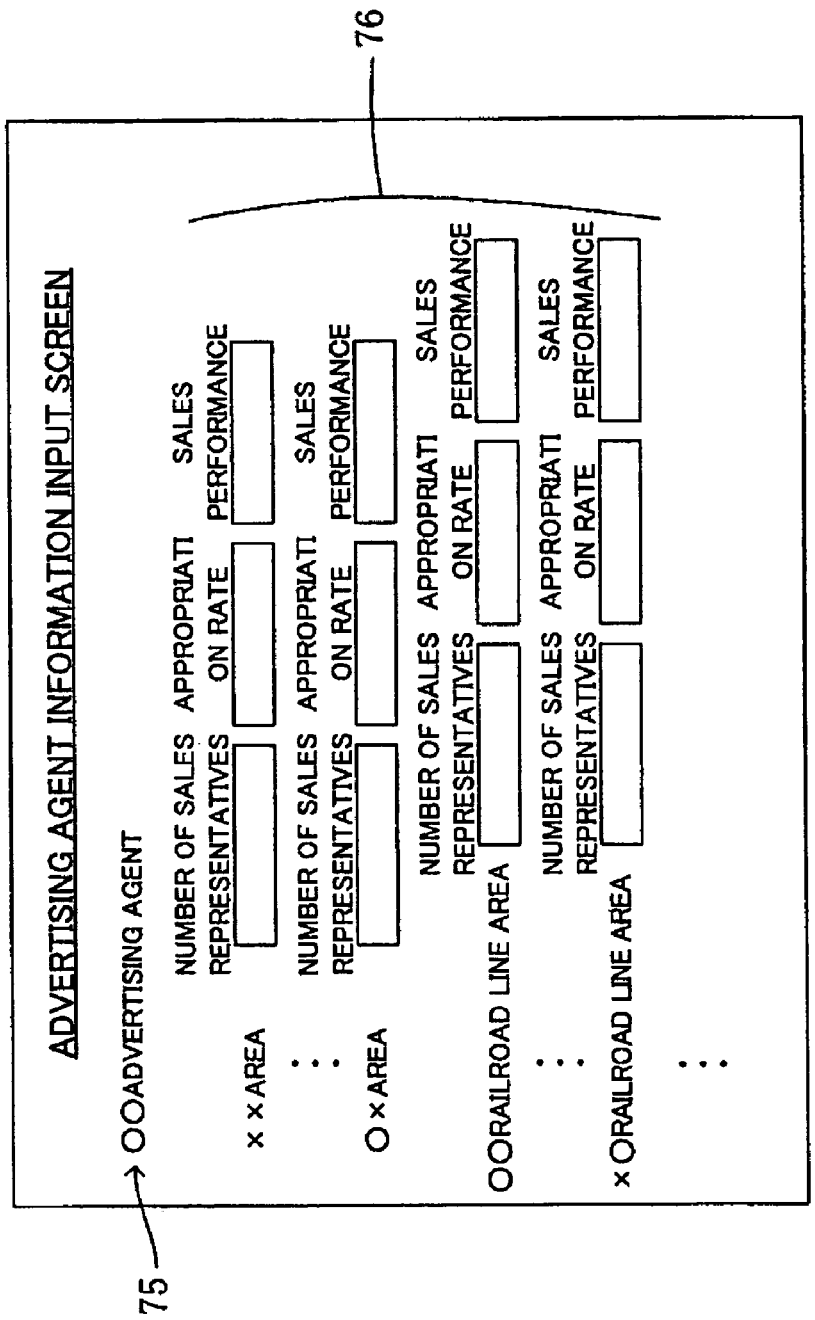
FIG. 5 shows a screen for inputting advertising agent information displayed by an advertising agent terminal that comprises the support system of FIG. 1.

FIG. 5 shows an example of a screen for inputting advertising agent information. As shown in FIG. 5, in the screen for inputting advertising agent information, display areas 75 for displaying the name of the advertising agent, and input areas 76 for inputting other information concerning the advertising agent are provided.

The advertising agent information, as shown in FIG. 5, includes various information concerning advertising ability, such as, number of sales representatives, appropriation rate, and sales performance, shown by area, and railroad line. The advertising agent information shown in FIG. 5 is just one example. Other information concerning advertising ability, such as for example, sales performance according to broadcasting medium, such as, television broadcasting, or radio broadcasting, and alliance relation with each broadcasting medium, may be included in the advertising agent information.

After the screen for inputting the advertising agent information is displayed, the person responsible of the advertising agent B inputs the advertising agent information concerning the advertising agent B that he/she belongs to, to each input area 76, applying an input device, which the advertising agent terminal 50 comprises. The advertising agent terminal 50 sends the input advertising agent information to the support server 20 via the communication network 60, according to the instructions of the person responsible of the advertising agent B, who completed input of the advertising agent information.

In a case where the advertising agent information is already registered, the information that is presently registered is displayed in the screen for inputting advertising agent information. Therefore, by deleting or changing the information displayed in the input areas 76, change of advertising agent information can be carried out.

The support server 20 determines whether or not to receive the advertising agent information from the advertising agent terminal 50, after sending the screen information (Step S203). In a case where the support server 20 determines not to receive the advertising agent information, (Step S203; NO), the support server 20 returns to the processing of Step S203, and waits for advertising agent information from the advertising agent terminal 50. On the other hand, in a case where the support server 20 determines to receive the advertising agent information, (Step S203; YES), the support server 20 stores the received advertising agent information to the database 21 (Step S204). By this, the support server 20 newly registers, or updates the advertising agent information. After the advertising agent information is stored in the database 21, the processing for obtaining the advertising agent information is completed.

Figure 6:
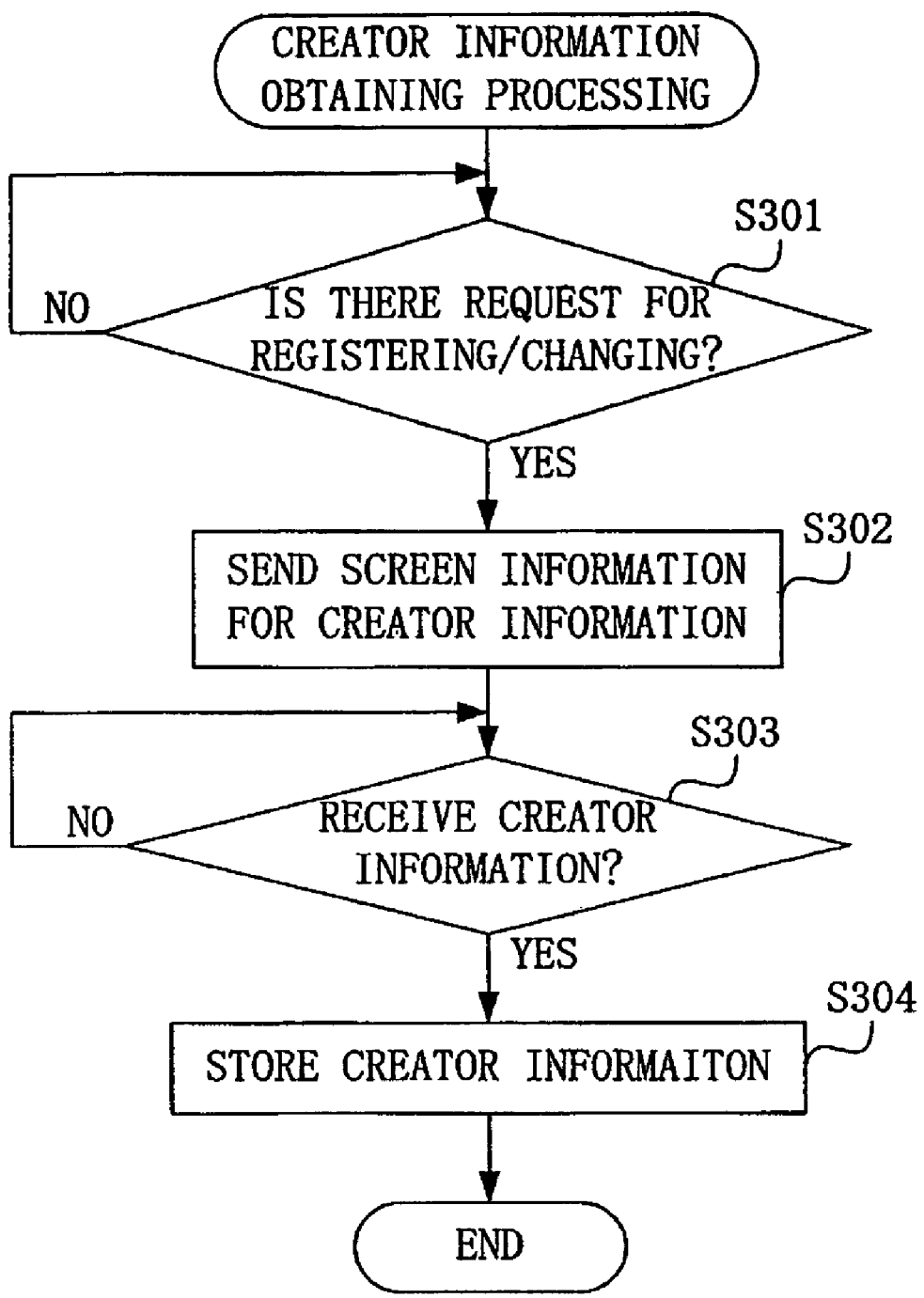
FIG. 6 is a flowchart showing a processing for obtaining creator information, performed by the support server, in the first embodiment.

FIG. 6 is a flow chart showing an example of a processing for obtaining creator information from the creator of a content (film making company).

Below, an example where the support server 20 obtains creator information, which will be described later, from a film making company C that manages the creator terminal 30, and stores the obtained creator information to the database 21 will be described. It is assumed that the film making company C, carries out a user registration to the support server 20, applying the creator terminal 30, and obtains a user ID, and password, beforehand.

First, the support server 20 requests for the input of a user ID, and password, in response to an access request from a creator terminal 30. The access request is made by for example, the person responsible of the film making company C, operating the creator terminal 30, and designating a URL of the support server 20.

The support server 20 performs authentication processing using the user ID, and password, input in response to the request. In a case where the film making company C is authenticated as the correct user, the support server 20 allows access from the creator terminal 30.

The creator terminal 30 performs a registering request, or a changing request of creator information, to the support server 20, following the operation of the person responsible of the film making company C, in a case where access to the support server 20 is permitted. Here, a registering request is performed in a case creator information is registered for the first time, and changing request is performed in a case where creator information is already registered. Additionally, the registering request and the changing request of the creator information are performed according to each content. For example, in a case where a content that already has a creator information registered is designated, the changing request is performed, and in a case where a content that does not have a creator information registered yet is designated, the registering request is performed.

After permitting access, the support server 20 determines whether or not there is a registering request, or a changing request from the creator terminal 30 (Step S301). In a case where the support server 20 determines that there is not either a registering request, nor a changing request (Step S301; NO), the support system server 20 returns the processing to Step S301, and waits for a registering request, or a changing request. On the other hand, in a case where the support server 20 determines that there is either a registering request, or a changing request (Step S301; YES), the support server 20 sends screen information, for displaying a screen, for inputting the creator information, to the creator terminal 40 via the communication network 60 (Step S302).

Receiving screen information, the creator terminal 30 displays a screen, on a display device that the creator terminal 30 comprises, for inputting creator information, based on the received screen information.

Figure 7:
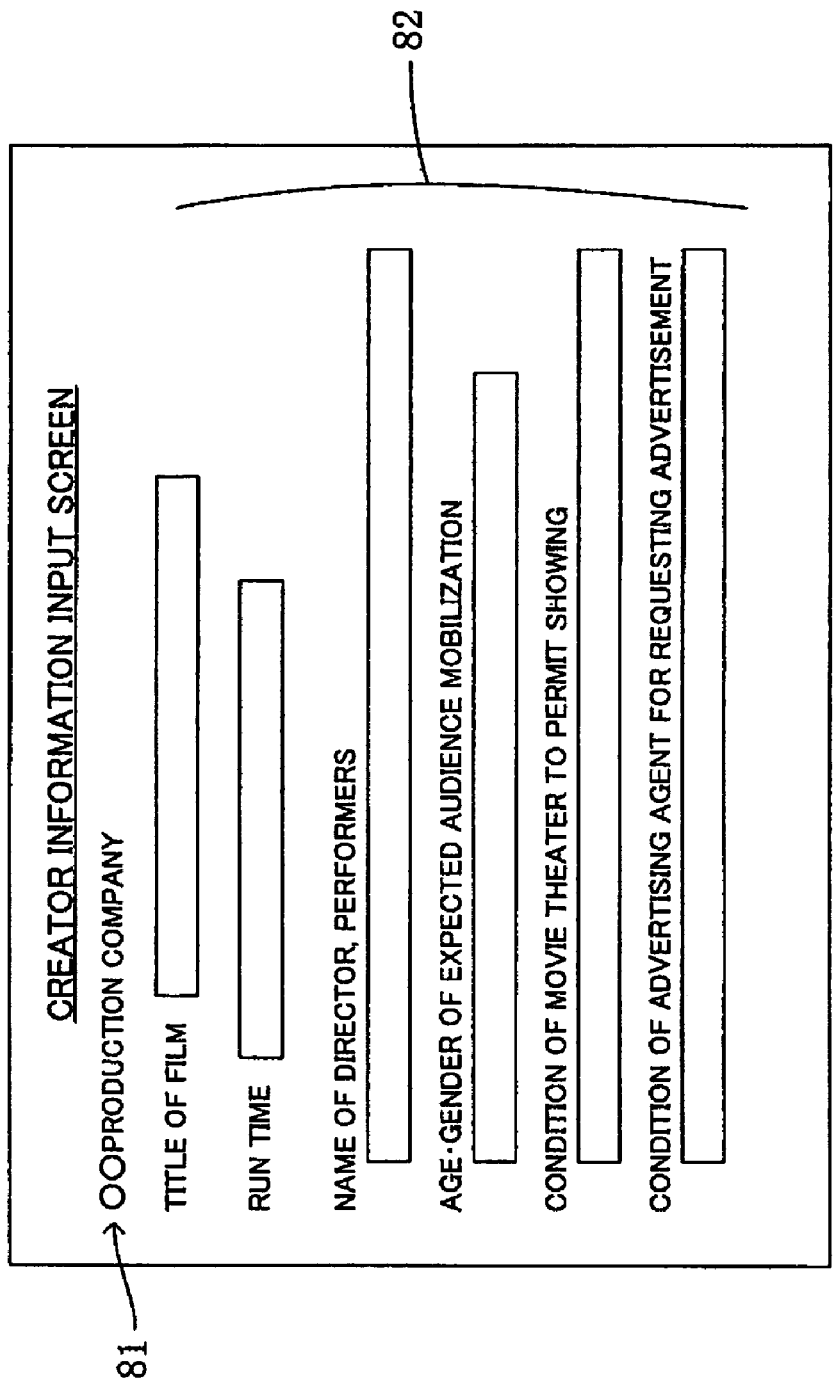
FIG. 7 shows a screen for inputting creator information displayed by a creator terminal that comprises the support system of FIG. 1.

FIG. 7 shows an example of a screen for inputting creator information. As shown in FIG. 7, in the screen for inputting creator information, display areas 81 for displaying the name of the film making company, and input areas 82 for inputting other information concerning the film making company are provided.

The creator information, as shown in FIG. 7, includes various information concerning the film making company and the content, such as information showing the title of a film, run time, name of director, name of performer, requested date of first run, and age and gender of expected audience mobilization. Furthermore, in this example, information showing condition of movie theater to permit showing of the content (hereinafter referred to as "movie theater condition information"), and information showing condition of advertising agent to request advertisement of the content (hereinafter referred to as "advertising agent condition information") is included. The creator information shown in FIG. 7 is one example. In the creator information, other information concerning the content, such as film data and expected date of completion is included in a case where the content is completed, and the genre of the content, such as domestic movie, foreign movie, or an animated film, is included in a case where the content is not completed yet.

The movie theater condition information, shows conditions for permitting the running of the content, concerning for example, a part or the whole movie theater information, which was described above. Concretely, conditions are for example that the screen size is larger than 6 m×22 m, the applied projector is model X, of A company, and the seating capacity is over 300, etc.

The advertisement condition information, shows conditions for an advertisement agent that is requested advertisement of the content, concerning for example, a part or the whole advertising agent information, which is described above. Concretely, conditions are for example that there are over 20 sales representatives in both the east coast, and the west coast, or there is a sales performance of both the east cost and the west coast, obtaining a box-office revenue of 300 million dollars, annually.

After the screen for inputting the creator information is displayed, the person responsible of the film making company C inputs the creator information concerning the film making company C that the person responsible of the film making company C belongs to, and the content that the film making company C created, to each input area 82, applying an input device that the creator terminal 30 comprises. The creator terminal 30 sends the creator information to the support server 20 via the communication network 60, according to the instructions of the person responsible of the film making company C, who completed input of the creator information.

When inputting the title of the content to the screen for inputting the creator information, in a case where the creator information is already registered, the information that is presently registered is displayed in the input areas 82. Concretely, the creator terminal 30 sends a title information showing the input title to the support server 20, in response to the input title. The support server 20 searches the database 21 in response to the provided title information. In a case where a creator information that shows the same title as the tide shown by the provided title information is stored, the support server 20 sends the information for displaying the stored content of the creator information to the creator terminal 30. The creator terminal 30 can display the screen for displaying the creator information that is already registered, based on the provided information. Therefore, the change of creator information can be performed by deleting or changing the information displayed in the input areas 82.

The support server 20 determines whether or not to receive the creator information from the creator terminal 30, after sending the screen information (Step S303). In a case where the support server 20 determines not to receive the creator information, (Step S303; NO), the support server 20 returns to the processing of Step S303, and waits for the creator information from the creator terminal 30. On the other hand, in a case where the support server 20 determines to receive the creator information, (Step S303; YES), the support server 20 stores the received creator information to the database 21 (Step S304). By this, the support server 20 newly registers, or updates the creator information. After the creator information is stored in the database 21, the processing for obtaining the creator information is completed.

Figure 8:
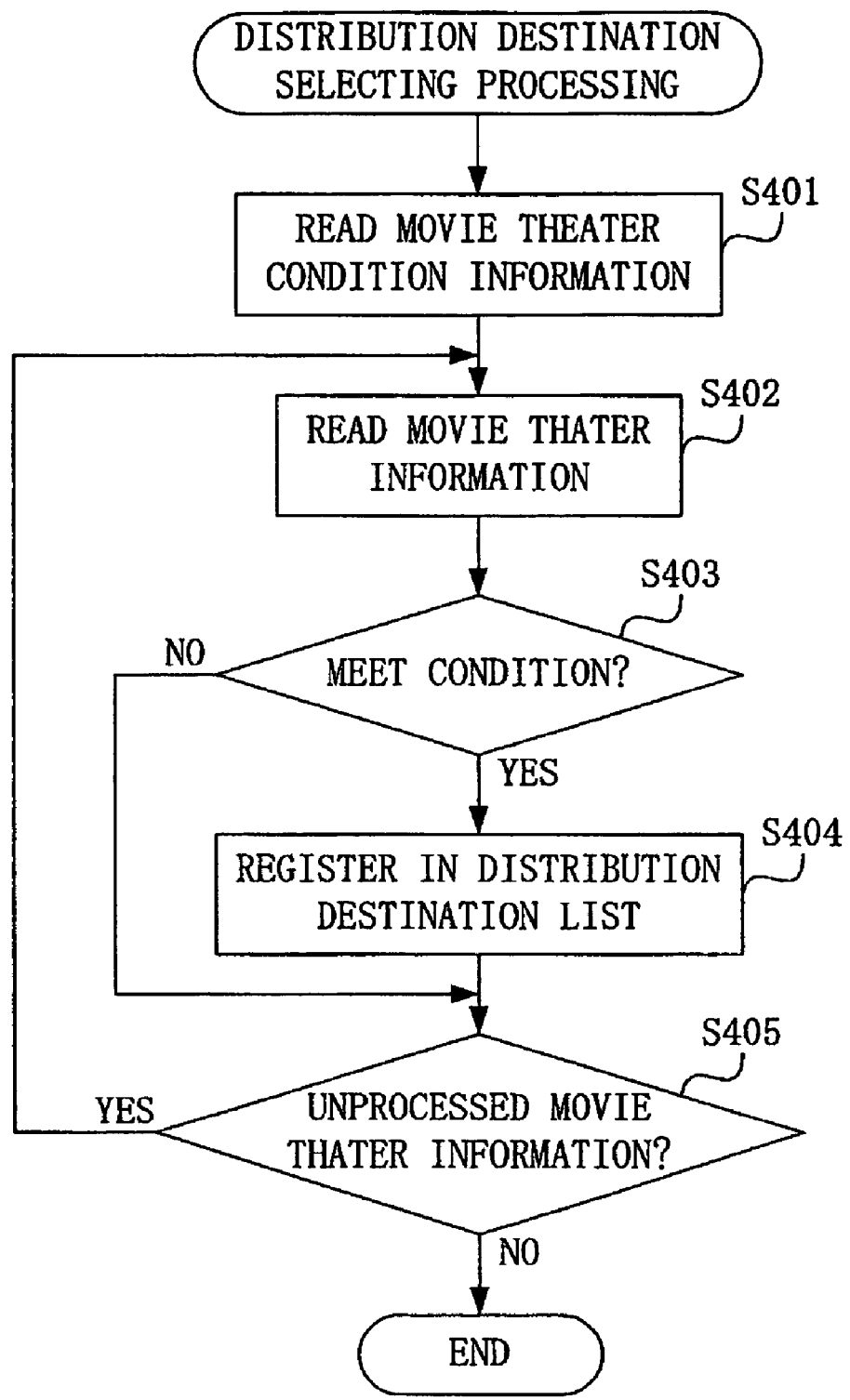
FIG. 8 is a flowchart showing a processing for selecting the distribution destination, performed by the support server, in the first embodiment.

FIG. 8 is a flow chart showing an example of processing for selecting a distribution destination of a content, performed by the support server 20. The processing for selecting a distribution destination is performed, for example, in a case where the creator information is stored in the database 21.

Below, an example where the support server 20 selects movie theaters for distributing a content D that a film making company C created, from movie theaters specified by the movie theater information, stored in the database 21. It is assumed that the creator information concerning the film making company C and the content D is stored in the database 21, by the above processing for obtaining the creator information.

First, the support server 20 reads the movie theater condition information, included in the creator information concerning the content D, from the database 21 (Step S401).

Next, the support server 20 reads one movie theater information stored in the database 21 (Step S402). In the loop processing of steps S402 to S405, each time the support server 20 performs processing of Step S402, the support server 20 reads the movie theater information one by one, in a predetermined order, such as alphabetical order of name of movie theater.

After the movie theater information is read, the support server 20 determines whether the content of the read movie theater information meets the condition, shown by the movie theater condition information, by comparing the content of the movie theater condition information, and the content of the read movie theater information (Step S403). In a case where the support server 20 determines that the condition is not met, (Step S403; NO), the support server 20 performs processing of Step S405, which will be later described. On the other hand, in a case where the support server 20 determines that the condition is met, (Step S403; YES), the support server 20 registers the name of the movie theater that the read movie theater information shows, to a distribution destination list (Step S404).

Next, the support server 20 determines whether or not, there is unprocessed movie theater information in the database 21 (Step S405). In a case where the support server 20 determines that there is unprocessed movie theater information (Step S405; YES), the support server 20 returns to the processing of Step S402. On the other hand, in a case where the support server 20 determines that there isn't unprocessed movie theater information (Step S405; NO), the support server 20 determines that processing concerning every movie theater has been performed.

Then, the support server 20 stores the distribution destination list, made by loop processing of steps S402 to S405 to the database 21, and completes the processing for selecting the distribution destination.

As the above, the list of movie theaters that are distribution destinations of the content D, is created following the condition shown by the movie theater condition information.

The support server 20 sends the created distribution destination list, by for example electronic mail, to the creator terminal 30 that the film making company C, which created the content D, manages. By this, the support server 20 notifies the movie theaters that are to be the distribution destinations of the content D, to the film making company C. Also, the support server 20 sends to each user terminal 40, which is managed in each movie theater that is registered in the created distribution destination list, electronic mail notifying that the movie theater is selected as the distribution destination of the content D. By this, the support server 20 notifies the manager of each movie theater that was registered in the distribution destination list, that the movie theater is selected as the distribution destination of the content D.

The film making company C may further select the movie theaters to distribute the content D, from the movie theaters registered in the received distribution destination list, and may send the selection result to the support server 20, applying the creator terminal 30. In this case, the support server 20 may notify each manger of the movie theater, following the selection result provided by the creator terminal 30.

In a case where the content D, namely the film data is registered as a part of creator information, the support server 20 sends the film data to the user terminal 40 of the movie theater that was selected as the distribution destination. On the other hand, in a case where the film data is not yet registered, the support server 20 sends the film data to the user terminal 40 of the movie theater that was selected as the distribution destination, as soon as the film data is registered.

Figure 9:
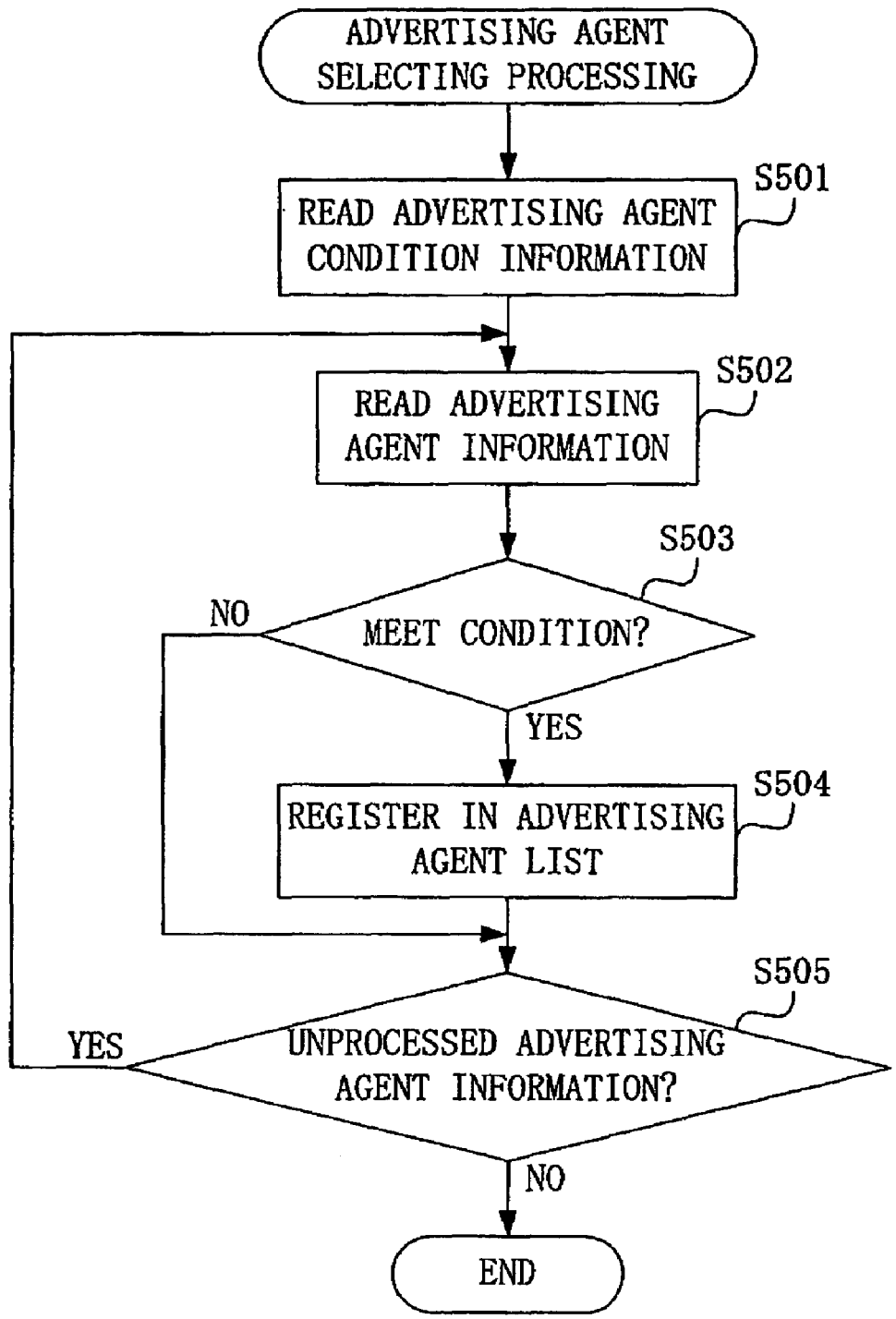
FIG. 9 is a flowchart for showing a processing for selecting the advertising agent, performed by the support server, in the first embodiment.

FIG. 9 is a flowchart showing an example of processing for selecting an advertising agent, performed by the support server 20. The processing for selecting an advertising agent is carried out, for example, in a case where the creator information is registered in the database 21.

Below, an example where the support server 20 selects advertising agents which become targets for requesting advertisement of content D that the film making company C created, from advertising agents specified by the advertising agent information, stored in the database 21. It is assumed that the creator information concerning the film making company C and the content D is stored in the database 21, by the above processing for obtaining the creator information.

First, the support server 20 reads the advertising agent condition information, included in the creator information concerning the content D, from the database 21 (Step S501).

Next, the support server 20 reads one advertising agent information stored in the database 21 (Step S502). In the loop processing of steps S502 to S505, each time the support server 20 performs processing of Step S502, the support server 20 reads the advertising agent information one by one, in a predetermined order, such as alphabetical order of name of advertising agent.

After the advertising agent information is read, the support server 20 determines whether the content of the read advertising agent information meets the condition, shown by the advertising agent condition information, by comparing the content of the advertising agent condition information, and the content of the advertising agent information (Step S503). In a case where the support server 20 determines that the condition is not met, (Step 503; NO), the support server 20 performs processing of Step S505, which will be later described. On the other hand, in a case where the support server 20 determines that the condition is met, (Step S503; YES), the support server 20 registers the name of the advertising agent that the read advertising agent information shows and a part of the advertising agent information (for example, information concerning an item designated in the advertising agent condition information) to an advertising agent list (Step S504).

Next, the support server 20 determines whether or not, there is unprocessed advertising agent information in the database 21 (Step S505). In a case where the support server 20 determines that there is unprocessed advertising agent information (Step S505; YES), the support server 20 returns to the processing of Step S502. On the other hand, in a case where the support server 20 determines that there isn't unprocessed advertising agent information (Step S505; NO), the support server 20 determines that processing concerning every advertising agent has been performed.

Then, the support server 20 stores the advertising agent list, made by loop processing of steps S502 to S505, to the database 21, and completes the processing for selecting the advertising agent.

As the above, the list of advertising agents that are targets for requesting advertisement of the content D is created following the condition shown by the advertising agent condition information.

The support server 20 sends the created advertising agent list, by for example electronic mail, to the creator terminal 30 that the film making company C, which created the content D, manages. By this, the support server 20 notifies the advertising agents that are targets for requesting advertisement of the content D, to the film making company C. The film making company C decides an advertising agent to request the advertisement of the content D, from the advertising agents registered in the advertising agent list, referring to the information registered in the provided advertising agent list. The person responsible of the film making company C notifies the decided advertising agent to the support server 20, applying the creator terminal 30. In response to this notice, the support server 20, applying the advertising agent information stored in the database 21, sends to the advertising agent terminal 50, which is managed by the advertising agent, that was selected by the film making company C, electronic mail notifying that for example, the advertising agent was selected as the advertising agent to advertise the content D. By this, the support server 20 notifies the selected advertising agent that the advertising agent is selected as the advertising agent to advertise the content D.

The advertising agents that are listed on the advertising agent list may be directly determined as the advertising agents to request advertising of the content D. In this case, information showing the number of advertising agents that are requested, and priority of the condition for selecting the advertising agent is included in the advertising agent condition information. The support server 20, extracts a predetermined number of advertising agents that have achieved excellent results, concerning the high priority condition, from the advertising agents that meet the conditions given by the advertising agent condition information, and determines as the advertising agents to request advertisement.

As described above, in the first embodiment, the movie theaters to which the content is distributed to, are determined by the movie theater condition information, specified by the content creator. By this, movie theaters which have the facilities and environment that the content creator requests, are selected easily and rapidly, as the distribution destinations of the content. Namely, the adequate distribution destinations of the content can be easily determined, and the distribution routes of the content can be easily and adequately determined.

Also, in the first embodiment, the list of advertising agents that are the targets for requesting advertising of the content, is made based on the advertising agent condition information specified by the content creator. By this, advertising agents that have the business ability that the content creator requests, are selected easily, and rapidly. Namely, the selection of the advertising agents that the content creator requests, can be carried out easily and rapidly.

The film making company may distribute the film data to the movie theaters via the advertising agent, which is requested to advertise the movie. In this case, the film data is distributed in distribution routes, such as from the film making company to the requested advertising agent, and from the requested advertising agent to the movie theaters. In this case also, as above, the distribution routes can be easily and adequately determined.

The support system 10 in the first embodiment, is a system especially effective in a situation where a content creator is dominating, in a market where a content creator, a content user, and an advertising agent participates. For example, the support system 10 is effective in a market where a creator who created a content, which is anticipated to gain a high box-office revenue, is dominant. In the above embodiment, the support server 20 may be managed by the film creator dominant in the market.

In the above support system 10, the advertising agent does not have to exist. Namely, the advertising agent terminal 50 may be managed by the system manager, content creator, or the manager of the movie theater.

Second Embodiment

Next, a second embodiment of the present invention will be described with reference to the drawings. Descriptions for the overlapping parts will be omitted by putting the same reference numerals on the drawings.

Figure 10:
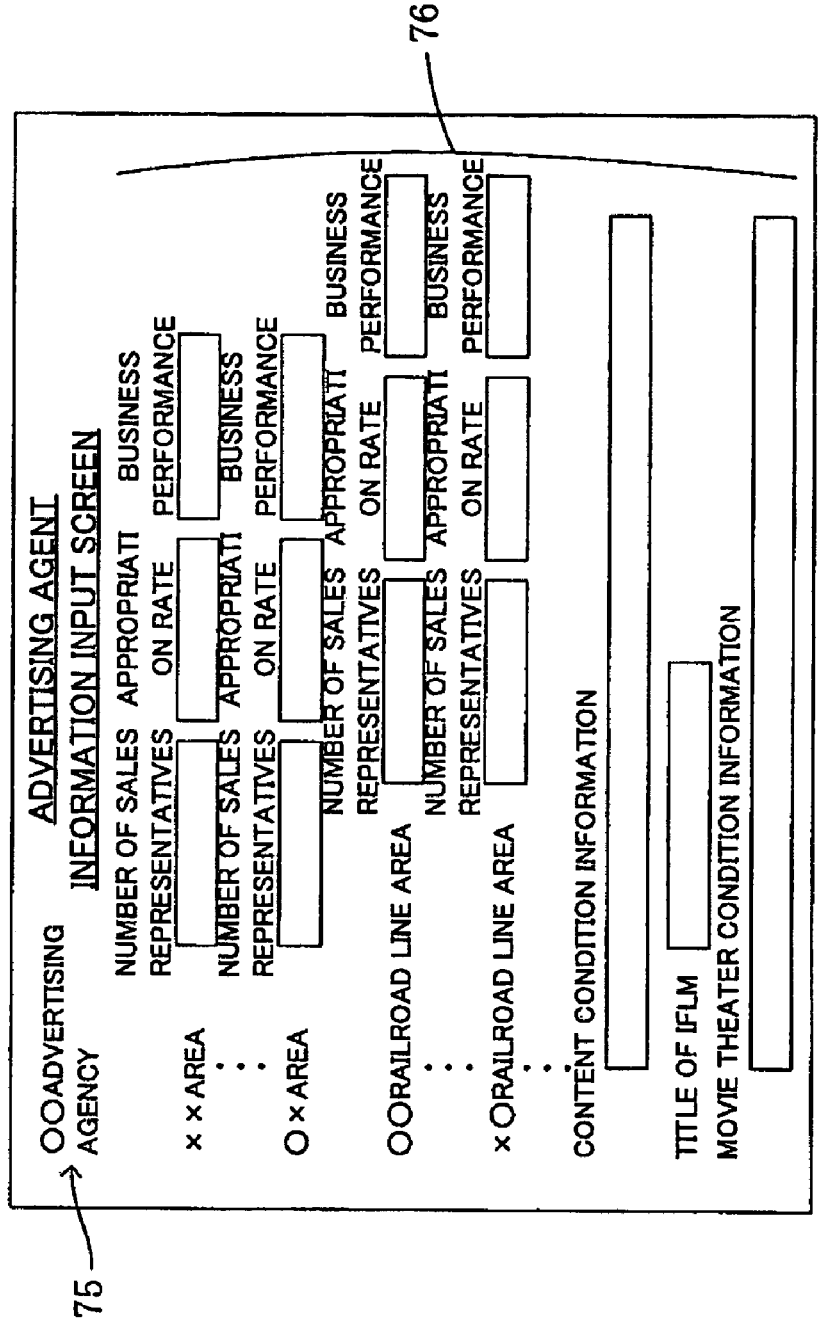
FIG. 10 shows a screen for inputting advertising agent information displayed by the advertising agent terminal, in the second embodiment.

FIG. 10 shows an example of a screen for inputting advertising agent information according to this embodiment.

In this example, the input areas 76 for inputting content condition information showing the permissible content as target for advertisement, and movie theater condition information showing the condition of the movie theater that permits showing of the content that is an advertising target, is provided. By the processing for obtaining the advertising agent information, as FIG. 4, advertising agent information, including content condition information and movie theater condition information, is stored in the database 21.

The content condition information shows for example the condition of the permissible content as the advertisement target, concerning a part or the whole creator information. Concretely, conditions are for example, age group of expected audience mobilization is 10 s to 20 s, requested date of first run is in a predetermined period, or the run time is over 2 hours, etc. The director, and each actor may be ranked by practical achievement of creation of the past (for example, the number of films that the director directed in the past, the box-office revenue of the film that the director directed in the past), practical achievement of appearance (for example, the number of films that each actor appeared in the past, the number of films that each actor appeared as the leading role in the past, and the box-office revenue of the films that each actor appeared in the past), and the rank may be specified as the condition.

The movie theater condition information shows the condition for permitting the showing of the content that is the advertisement target, concerning a part or the whole movie theater information. Concretely, conditions are for example, the screen size is over 5 m×20 m, the model of the projector used is Y of company B, there is no plan of showing after the predetermined day, or the seating capacity is 200 to 250.

Note that in the second embodiment, the creator of the content does not carry out designation of movie theater condition information and advertising agent condition information, shown in the first embodiment.

Figure 11:
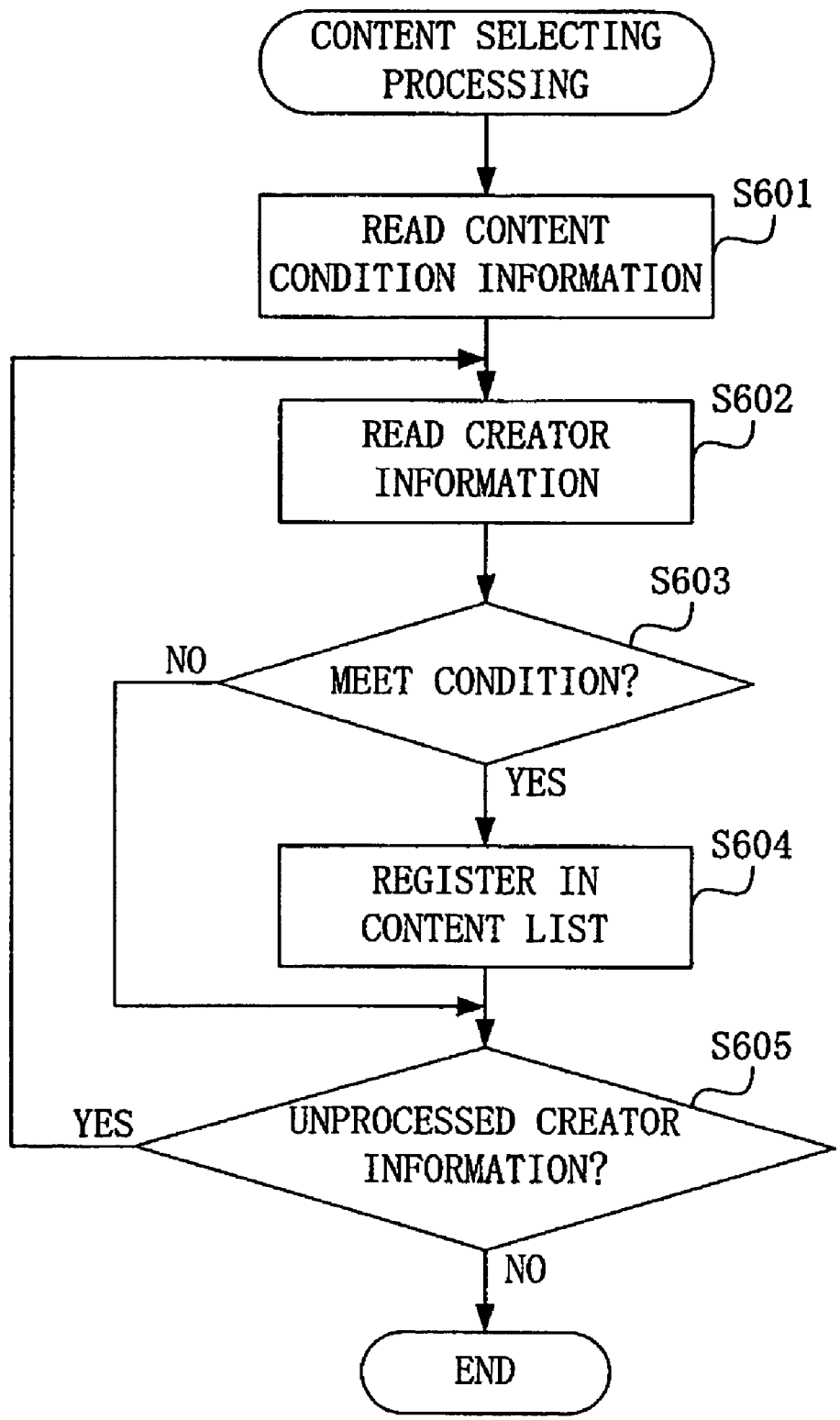
FIG. 11 is a flowchart showing a processing for selecting a content, performed by the support server, in the second embodiment.

FIG. 11 is a flowchart showing an example of the processing for selecting the content, which the support server 20 conducts. The processing for selecting the content is conducted, for example on a regular basis (every month, every three month).

Below, a case where the support server 20 selects the contents that advertising agent B advertises, from the contents shown by the creator information, stored in the database 21, will be described.

First, the support server 20 reads the content condition information included in the advertising agent information of the advertising agent B, from the database 21 (Step S601).

Then, the support server 20 reads one creator information, stored in the database 21 (Step S602). In the loop processing of steps S602 to S605, each time the support server 20 performs processing of Step S602, the support server 20 reads the creator information one by one, in a predetermined order, such as alphabetical order of name of creator.

After the creator information is read, the support server 20 determines whether the content of the read creator information meets the condition, shown by the content condition information, by comparing the content of the content condition information, and the content of the read creator information (Step 603). In a case where the support server 20 determines that the condition is not met, (Step S603; NO), the support server 20 performs processing of Step S605, which will be later described. On the other hand, in a case where the support server 20 determines that the condition is met, (Step S603; YES), the support server 20 registers the name of the content and the name of the creator, shown by the read creator information, to a content list (Step S604).

Next, the support server 20 determines whether or not, there is unprocessed creator information in the database 21 (Step S605). In a case where the support server 20 determines that there is unprocessed creator information (Step S605; YES), the support server 20 returns to the processing of Step S602. On the other hand, in a case where the support server 20 determines that there isn't unprocessed creator information (Step S605; NO), the support server 20 determines that processing concerning every content has been performed.

Then, the support server 20 stores the content list, made by loop processing of steps S602 to S605, to the database 21, and completes the processing for selecting the content As the above, the contents that are advertised by advertising agent B are selected according to the condition shown by the content condition information.

The support server 20 sends the created content list, by for example electronic mail to the advertising agent terminal 50. By this the support server 20 notifies the advertising agent B of the contents selected as the advertisement targets. The support server 20 sends electronic mail to each creator terminal 30, managed by the creator who created the content, registered in the created content list, that for example the content will be advertised by the advertising agent B. By this, the support server 20 notifies each content creator that the content will be advertised by the advertising agent B.

From the contents registered in the content list that the advertising agent B received, the content that will be advertised may be further selected applying the advertising agent terminal 50, and the selection result thereof may be sent to the support server 20. In this case, the support server 20 may notify the content creator, according to the selection result provided from the advertising agent terminal 50.

In a case where the content that was selected as the advertisement target, namely the film data, is registered as a part of the creator information, the support server 20 sends the film data to the advertising agent terminal 50 that the manager of the advertising agent B manages. On the other hand, if the film data is not yet registered, the support server 20 sends the registered film data to the advertising agent terminal 50, managed by the advertising agent B, as soon as the film data is registered.

Figure 12:
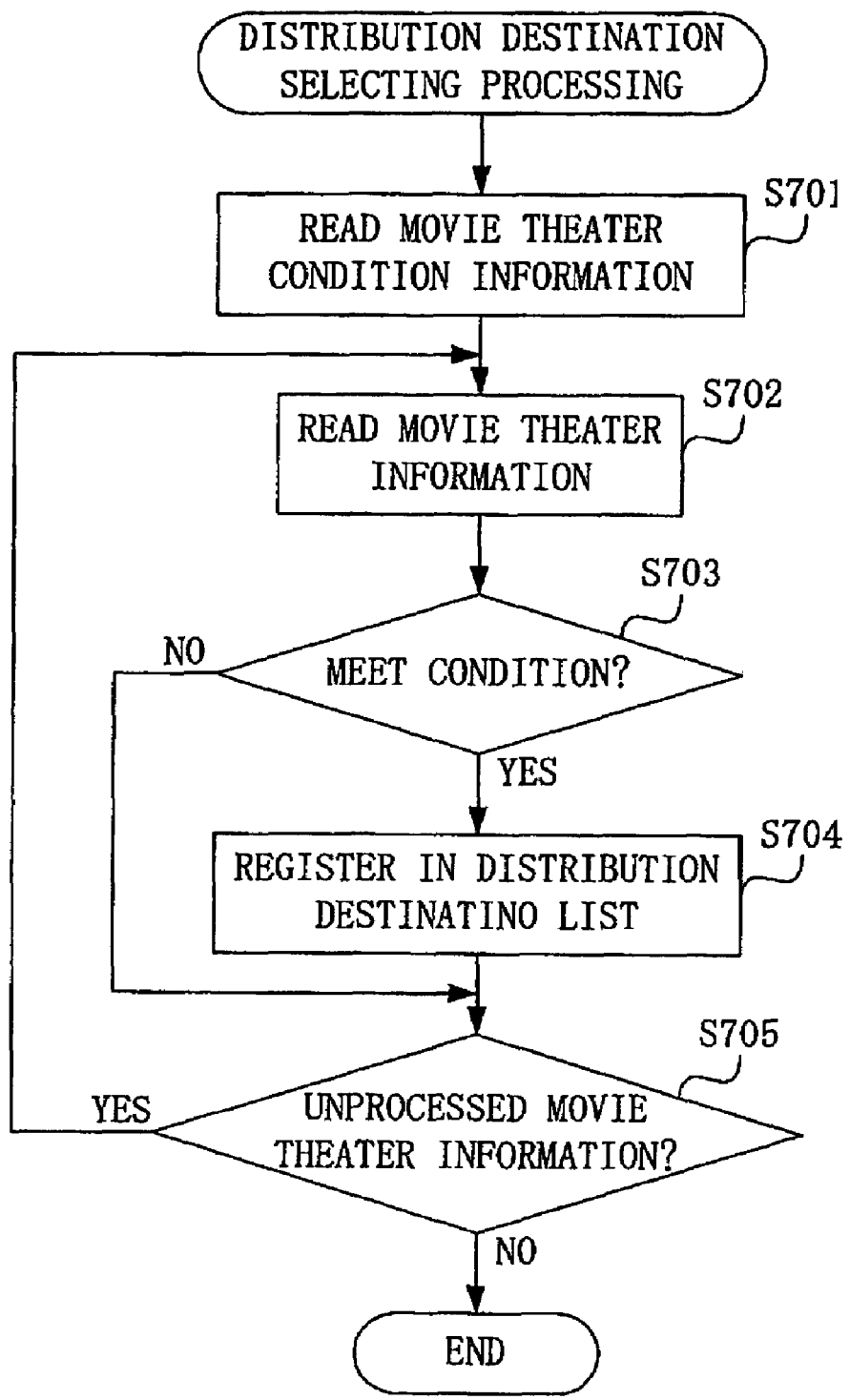
FIG. 12 is a flowchart showing a processing for selecting a distribution destination, performed by the support server, in the second embodiment.

FIG. 12 is a flow chart showing an example of the processing for selecting the distribution destination of the content, performed by the support server 20. The processing for selecting the distribution destination is carried out in a case where, for example, the advertising agent to request advertisement of the content shown by the creator information, stored in the database 21, is determined, and movie theater condition information concerning the content is registered by the advertising agent.

Below, a case where the support server 20 selects the movie theaters to which the content E, which is decided to be advertised by the advertising company B, is distributed, from the movie theaters specified by the movie theater information, stored in the database 21, will be described.

First, the support server 20 reads from the database 21, the movie theater condition information concerning the content E, which the advertising agent B registered (Step S701).

Then, the support server 20 reads one movie theater information, stored in the database 21 (Step S702). In the loop processing of steps S702 to S705, each time the support server 20 performs processing of Step S702, the support server 20 reads the movie theater information one by one, in a predetermined order, such as alphabetical order of name of movie theater.

After the movie theater information is read, the support server 20 determines whether the content of the read movie theater information meets the condition, shown by the movie theater condition information, by comparing the content of the movie theater condition information, and the content of the read movie theater information (Step 703). In a case where the support server 20 determines that the condition is not met, (Step S703; NO), the support server 20 performs processing of Step S705, which will be later described. On the other hand, in a case where the support server 20 determines that the condition is met, (Step S703; YES), the support server 20 registers the name of the movie theater, shown by the read movie theater information, to a distribution destination list (Step S704).

Next, the support server 20 determines whether or not, there is unprocessed movie theater information in the database 21 (Step S705). In a case where the support server 20 determines that there is unprocessed movie theater information (Step S705; YES), the support server 20 returns to the processing of Step S702. On the other hand, in a case where the support server 20 determines that there isn't unprocessed movie theater information (Step S705; NO), the support server 20 determines that processing concerning every movie theater has been performed.

Then, the support server 20 stores the distribution destination list, made by loop processing of steps S702 to S705, to the database 21, and completes the processing for selecting the distribution destination.

As the above, the movie theaters that will be the distribution destinations of the content E are selected, according to the condition shown by the movie theater condition information.

The support server 20 sends the created distribution destination list, by for example electronic mail, to the advertising agent terminal 50, managed by the advertising agent B, and the creator terminal 30, managed by the film making company that created the content E. By this, the support server 20 notifies the movie theaters selected as the distribution destinations, to the advertising agent B and the film making company. The support server 20 sends electronic mail to each user terminal 40, managed in each movie theater, which is listed in the created distribution destination list, that for example the movie theater is selected as the distribution destination of content E. By this, the support server 20 notifies the manager of the movie theater that the movie theater was selected as the distribution destination of the content E.

From the movie theaters registered in the distribution destination list that the advertising agent B received, the movie theaters that are distributed the content E may be further selected applying the advertising agent terminal 50, and the selection result thereof may be sent to the support server 20. In this case, the support server 20 may notify the manager of each movie theater, according to the selection result provided from the advertising agent B.

In a case where the content E, namely the film data, is registered as a part of the creator information, the support server 20 sends the film data to the user terminals 40 that were selected as the distribution destinations. On the other hand, if the film data is not yet registered, the support server 20 sends the registered film data to the user terminals 40 that were selected as the distribution destinations, as soon as the film data is registered.

As described above, in the second embodiment, the content that is to be the advertisement target, is determined by the content condition information, specified by the advertising agent. By this, contents that the advertising agent requests, are selected easily and rapidly, and it is possible to carry out advertisement demonstrating the advertising ability fully. Namely, the contents that are to be the advertisement targets can be adequately, and easily determined, and the distribution routes of the contents can be easily determined.

Also, in the second embodiment, the movie theaters to distribute the content are determined based on the movie theater condition information designated by the advertising agent. By this, movie theaters that have the facilities and the environment that the advertising agent requests, are selected easily, and rapidly as the distribution destinations. Namely, the selection of the distribution destinations of the content that is the advertisement target can be adequately and easily determined.

The support system 10 in the second embodiment, is a system especially effective in a situation where an advertising agent is dominating, in a market where a content creator, a content user, and an advertising agent participate. For example, the support system 10 is effective in a market where an advertising agent that has strong-ties with the broadcasting media is dominant. In the above embodiment, the support server 20 may be managed by the advertising agent dominant in the market.

Third Embodiment

Next, a third embodiment of the present invention will be described with reference to the drawings. Descriptions for the overlapping parts will be omitted by putting the same reference numerals on the drawings.

Figure 13:
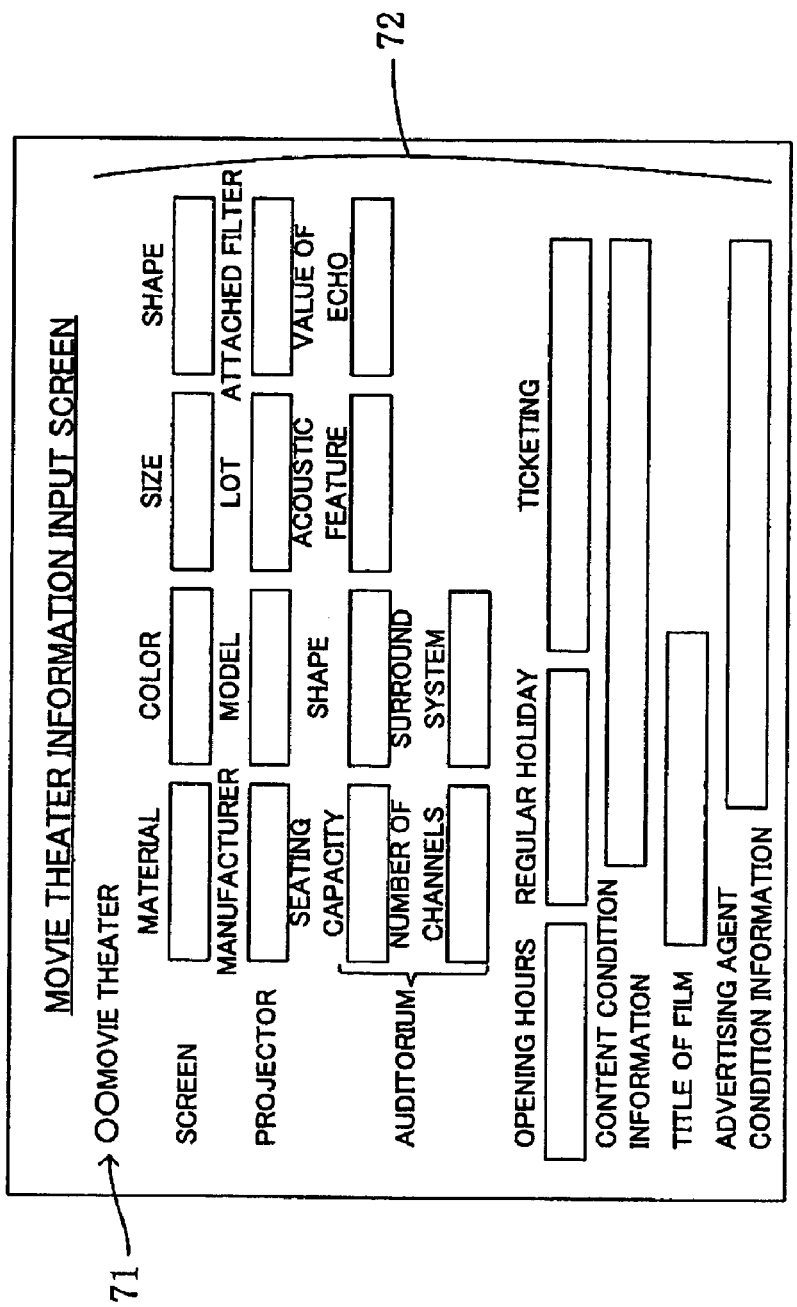
FIG. 13 shows a screen for inputting movie theater information displayed by the user terminal, in the third embodiment.

FIG. 13 shows an example of a screen for inputting movie theater information according to this embodiment. In this example, the input area 72 for inputting content condition information showing the condition for the content to be permitted as the target for showing, and the advertising agent condition information showing the condition for the advertising agent to be requested to advertise the content that will be shown, besides the information shown in FIG. 3. By the same processing as FIG. 2 for obtaining movie theater information, movie theater information that includes content condition information and advertising agent condition information is stored in the database 21.

The content condition information shows for example the condition of the permissible content as the showing target, concerning a part or the whole creator information. Concretely, conditions are for example, age group of expected audience mobilization is 10 s to 20 s, requested date of first run is in a predetermined period, or the run time is over 2 hours, etc. The director, and each actor may be ranked by practical achievement of creation of the past (for example, the number of films that the director directed in the past, the box-office revenue of the film that the director directed in the past), practical achievement of appearance (for example, the number of films that each actor appeared in the past, the number of films that each actor appeared as the leading role in the past, and the box-office revenue of the films that each actor appeared in the past), and the rank may be specified as the condition.

The advertisement condition information, shows conditions for an advertisement company that is requested advertising of the content, concerning for example, a part or the whole advertising agent information, which was described above. Concretely, conditions are for example that there are over 50 sales representatives in both the southern area and the northern area.

Note that in the third embodiment, the creator of the content does not carry out designation of movie theater condition information and advertising agent condition information, and advertising agent does not carry out designation of advertising agent condition information and movie theater condition information.

Figure 14:
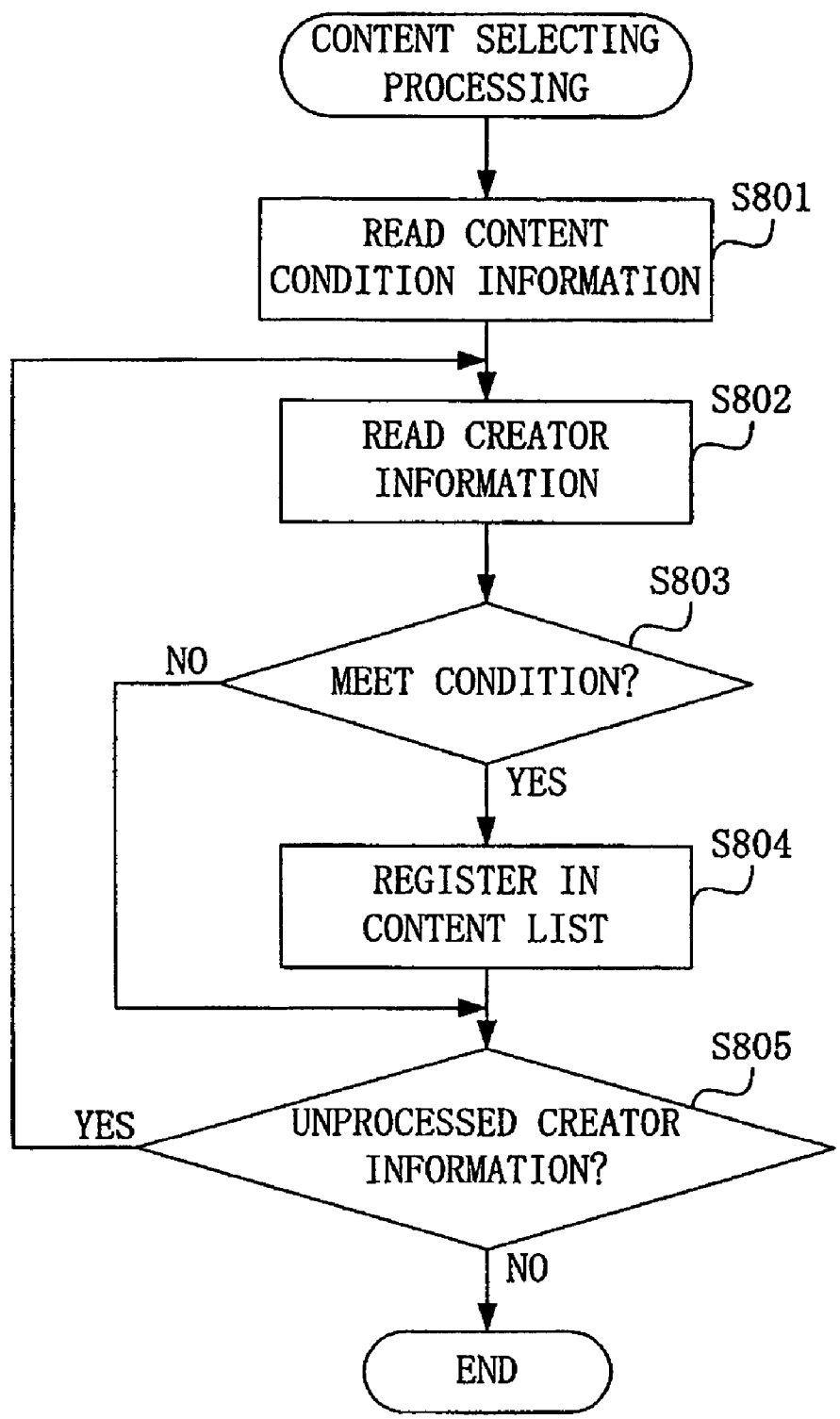
FIG. 14 is a flowchart showing a processing for selecting a content, performed by the support server, in the third embodiment.

FIG. 14 is a flowchart showing an example of the processing for selecting the content, which the support server 20 conducts. The processing for selecting the content is conducted, for example on a regular basis (every month, every three month).

Below, a case where the support server 20 selects the contents that will be shown in movie theater S, from the contents shown by the creator information stored in the database 21, will be described.

First, the support server 20 reads the content condition information included in the movie theater information concerning movie theater S, from the database 21 (Step S801).

Then, the support server 20 reads one creator information, stored in the database 21 (Step S802). In the loop processing of steps S802 to S805, each time the support server 20 performs processing of Step S802, the support server 20 reads the creator information one by one, in a predetermined order, such as alphabetical order of name of creator.

After the creator information is read, the support server 20 determines whether the content of the read creator information meets the condition, shown by the content condition information, by comparing the content of the content condition information, and the content of the read creator information (Step 803). In a case where the support server 20 determines that the condition is not met, (Step S803; NO), the support server 20 performs processing of Step S805, which will be later described. On the other hand, in a case where the support server 20 determines that the condition is met, (Step S803; YES), the support server 20 registers the name of the content and the name of the creator, shown by the read creator information, to a content list (Step S804).

Next, the support server 20 determines whether or not, there is unprocessed creator information in the database 21 (Step S805). In a case where the support server 20 determines that there is unprocessed creator information (Step S805; YES), the support server 20 returns to the processing of Step S802. On the other hand, in a case where the support server 20 determines that there isn't unprocessed creator information (Step S805; NO), the support server 20 determines that processing concerning every content has been performed.

Then, the support server 20 stores the content list, made by loop processing of steps S802 to S805, to the database 21, and completes the processing for selecting the content.

As the above, the contents to be shown in movie theater S are selected according to the condition shown by the content condition information.

The support server 20 sends the created content list, by for example electronic mail, to the user terminal 40, managed by the manager of the movie theater S. By this, the support server 20 notifies the manager of the movie theater S of the contents selected as the targets for showing. The support server 20 sends electronic mail to the creator terminal 20, managed by each creator who created each content, listed in the created content list, that for example the content will be shown in movie theater S. By this, the support server 20 notifies each content creator that the content will be shown in movie theater S.

From the contents registered in the content list that the manager of the movie theater S received, the content that will be shown may be further selected applying the user terminal 40, and the selection result thereof may be sent to the support server 20. In this case, the support server 20 may notify the content creator, according to the selection result provided from the user terminal 40.

In a case where the content that is the target for showing in movie theater S, namely the film data, is registered as a part of the creator information, the support server 20 sends the film data to the user terminal 40 that is managed in the movie theater S. On the other hand, if the film data is not yet registered, the support server 20 sends the registered film data to the user terminal 40, managed in the movie theater S, as soon as the film data is registered.

Figure 15:
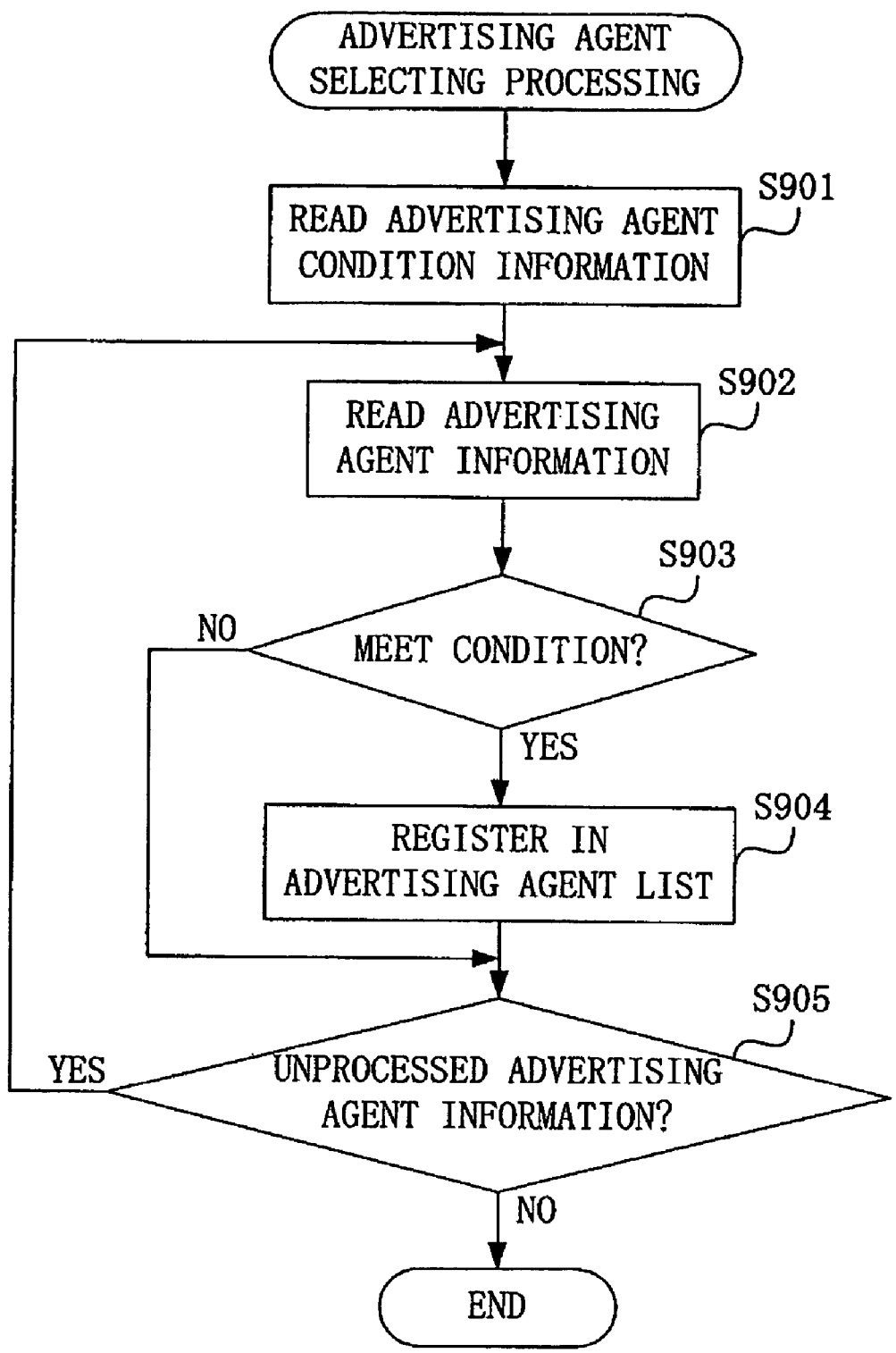
FIG. 15 is a flowchart showing a processing for selecting an advertising agent, performed by the support server, in the third embodiment.

FIG. 15 is a flowchart showing an example of processing for selecting an advertising agent, performed by the support server 20. The processing for selecting an advertising agent is carried out, for example, in a case where the movie theater for showing the content shown by the creator information registered in the database 21 is determined, and advertising agent condition information concerning the content is registered by the manager of the movie theater.

Below, an example where the support server 20 selects advertising agents which become targets for requesting advertisement of content F that is to be shown in movie theater S, will be described.

First, the support server 20 reads the advertising agent condition information concerning the content F, registered by the manager of the movie theater S, from the database 21 (Step S901).

Next, the support server 20 reads one advertising agent information stored in the database 21 (Step S902). In the loop processing of steps S902 to S905, each time the support server 20 performs processing of Step S902, the support server 20 reads the advertising agent information one by one, in a predetermined order, such as alphabetical order of name of advertising agent.

After the advertising agent information is read, the support server 20 determines whether the content of the read advertising agent information meets the condition, shown by the advertising agent condition information, by comparing the content of the advertising agent condition information, and the content of the read advertising agent information (Step S903). In a case where the support server 20 determines that the condition is not met, (Step 903; NO), the support server 20 performs processing of Step S905, which will be later described. On the other hand, in a case where the support server 20 determines that the condition is met, (Step S903; YES), the support server 20 registers the name of the advertising agent, and a part of the advertising agent information (for example information concerning an item designated in the advertising agent condition information) that the read advertising agent information shows, to an advertising agent list (Step S904).

Next, the support server 20 determines whether or not, there is unprocessed advertising agent information in the database 21 (Step S905). In a case where the support server 20 determines that there is unprocessed advertising agent information (Step S905; YES), the support server 20 returns to the processing of Step S902. On the other hand, in a case where the support server 20 determines that there isn't unprocessed advertising agent information (Step S905; NO), the support server 20 determines that processing concerning every advertising agent has been performed.

Then, the support server 20 stores the advertising agent list, made by loop processing of steps S902 to S905, to the database 21, and completes the processing for selecting the advertising agent.

As the above, the list of advertising agents that are targets for requesting advertisement of the content F is created following the condition shown by the advertising agent condition information.

The support server 20 sends the created advertising agent list, by for example electronic mail to the user terminal 40 that the manager of the movie theater S manages. By this, the support server 20 notifies the advertising agents that are targets for requesting advertisement of the content F, to the manager of the movie theater S. The manager of the movie theater S decides an advertising agent to request the advertisement of the content F, from the advertising agents registered in the advertising agent list, referring to the provided advertising agent list. Then, the manager of the movie theater S notifies the support server 20 of the determined advertising agent, applying the user terminal 40. In response to this notice, the support server 20 sends electronic mail to the advertising agent terminal 50, which is managed by the advertising agent, that was selected as the advertising agent to advertise the content F, that the advertising agent was selected. By this, the support server 20 notifies the selected advertising agent that the advertising agent is selected as the advertising agent to advertise the content F. Additionally, the support server 20 sends electronic mail showing the advertising agent determined for requesting advertisement, to the creator terminal 30, managed by the creator who created the content F, in response to the notification from the user terminal 40. By this, the support server 20 notifies the advertising agent that was determined as the advertising agent for requesting advertisement, to the creator.

The advertising agents that are listed on the advertising agent list may be directly determined as the advertising agents to request advertising of the content F. In this case, information showing the number of advertising agents that are requested, and priority of the condition for selecting the advertising agent is included in the advertising agent condition information. The support server 20, extracts a predetermined number of advertising agents that have achieved excellent results, concerning the high priority condition, from the advertising agents that meet the conditions given by the advertising agent condition information, and determines as the advertising agents to request advertisement.

As described above, in the third embodiment, the contents that are the showing targets are determined by the content condition information, specified by the content user. By this, the contents that the content user requests, can be selected easily and rapidly. Therefore, the contents that meet the facilities and the environment of the movie theater can be selected easily. Namely, the adequate distributors of the contents can be determined easily, and the distribution routes of the contents can be determined easily and adequately.

Also, in the third embodiment, a list of advertising agents that are the targets for requesting advertisement of the content, is created based on the advertising agent condition information designated by the content user. By this, advertising agents that have the advertising ability that the content user requests, can be selected easily and accurately.

The film making company may distribute the film data to the movie theater via the advertising agent requested to advertise the content. In this case, the film data is distributed in a distribution route from the film making company to the requested advertising agent, from the requested advertising agent to the movie theater, which is the providing destination.

The support system 10 in the third embodiment, is a system especially effective in a situation where a content user is dominating, in a market where a content creator, a content user, and an advertising agent participates. For example, the support system 10 is effective in a market where a content user who manages a so-called cinema complex, a movie theater that has a plurality of movie theaters in the same facility, is dominant. The support server 20 may be managed by the content user dominant in the market.

As described in each embodiment of the above, by determining a providing source of the content (for example the film making company), and a providing destination (for example the movie theater), and determining an intermediating destination (for example the advertising agent) if necessary, the distribution route of the film data is determined easily and adequately. The film data may be distributed according to the determined distribution route. In a case where the film data is distributed, it is preferable that the communication load is reduced by compression, and leak of information is prevented by encryption.

The content data may be distributed, divided in a plurality of times, or may be distributed all at once.

The user terminal 40 may store the provided content data to a recording medium, such as hard disk, CD (Compact Disc), DVD (Digital Versatile Disc), or semiconductor memory, and play the content (for example show a movie) applying the stored data, following the operation of the content user.

The content data may be provided to the content user by for example a method called streaming. In this case, the user terminal 40 managed by the content user performs playing processing of the received data, while performing the receiving processing of the content.

In each embodiment of the above, a priority may be set concerning conditions shown by the content condition information, advertising agent condition information, and movie theater condition information. Then, the support server 20, for example may ignore the low-priority conditions, and re-perform processing of the content determining processing, distribution destination selecting processing, and advertising agent selecting processing, in a case where information fulfilling every condition can not be found.

Charging processing towards the movie theater and the distributing agency may be of any kind. For example, the support server 20 may manage the movie-making expense, advertisement expenses, the number of audience mobilization, and admission charge, respectively calculate the share of the creator, movie theater, and the distributing agency, and perform various processing of for example, instructing to the server operated by a banking institution to make a payment of a predetermined amount from the designated account of the movie theater to the designated account of the creator.

In the embodiments of above, a case where a content creator, content user, or an advertising agent is dominant in a market, is assumed. However, even in a case where there is no such assumption, the present invention can be applied. In this case, the content creator, content user, and the advertising agent respectively register condition information, and the distribution route may be determined by the support server 20 performing matching of the registered conditions.

In each embodiment of above, a case where the content is film data was described. However, the content may be of another kind, such as motion-image data, still-image data, or voice data, as long as the content is a kind that is used in various facilities, such as movie theaters, public halls, or concert halls.

Also, in each embodiment of the above, various information was sent and received via the communication network 60. However, a part or the whole movie theater information, advertising agent information, or the creator information may be stored in a recording medium, or written on paper, and sent by mail.

Figure 16:
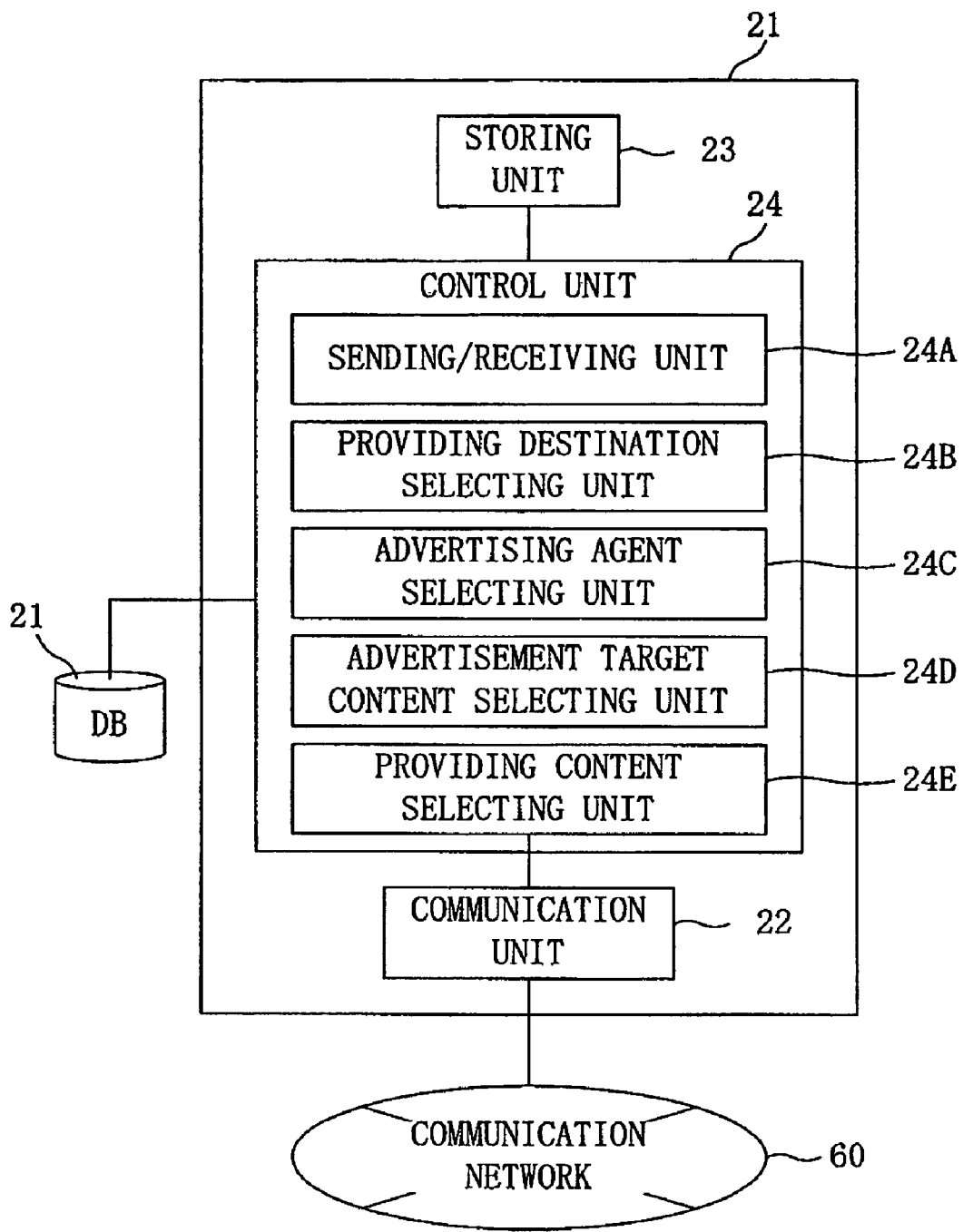
FIG. 16 is a structure diagram of the support server.

The support server 20, as shown in FIG. 16, is comprised of a communication unit 22, a storing unit 23, and a control unit 24. The communication unit 22 is connected to the communication network 60, and controls communication carried out with the support server 20, creator terminal 30, user terminal 40, and advertising agent terminal 50. The storing unit 23 is comprised of RAM (Random Access Memory), and ROM (Read Only Memory), and stores a control program (a support program for determining the route to provide the content) for executing each processing of the above. The control unit 24 is comprised of a CPU (Central Processing Unit), and operates following the control program of the storing unit 23.

In the case of the first embodiment, the control program of the storing unit 23, may be a program that controls the support server 20 (concretely the control unit 24) to execute a receiving step which receives the movie theater condition information provided from the user terminal 30 and the information of the movie theater provided from the user terminal 40, via the communication network 60, a saving step which saves the movie theater condition information and the information of the movie theater, received in the receiving step, and a step for extracting the information of the movie theater that meets the condition shown by the movie theater condition information, from the information of the movie theater, saved in the saving step, and selecting the user terminal placed in the movie theater, specified by the extracted information of movie theater.

In the case of the second embodiment, the control program of the storing unit 23 may be a program that controls the support server 20 (concretely the control unit 24) to execute a receiving step which receives the information of the content, provided from the creator terminal 30 and the content condition information, provided from the advertising agent terminal 50, via the communication network 60, a saving step which saves the information of the content and the content condition information, received in the receiving step, and a step for extracting the information of the content that meets the condition shown by the content condition information, from the information of the content, saved in the saving step, and selecting the content as the content to be advertised by the advertising agent, specified by the extracted information of content.

In the case of the third embodiment, the control program of the storing unit 23 may be a program that controls the support server 20 (concretely the control unit 24) to execute a receiving step which receives the information of the content, provided from the creator terminal 30 and the content condition information, provided from the user terminal 40, via the communication network 60, a saving step which saves the information of the content and the content condition information, received in the receiving step, and a step for extracting the information of the content that meets the condition shown by the content condition information, from the information of the content, saved in the saving step, and selecting the content as the content to be provided to the user terminal 40, specified by the extracted information of content.

By this, as shown in FIG. 16, the control unit 24 functions as a sending/receiving unit 24A which sends and receives information via the communication network 60, a providing destination selecting unit 24B which selects a providing destination of a content, an advertising agent selecting unit 24C which selects an advertising agent to request advertisement of the content, an advertisement target content selecting unit 24D which selects the content that is advertised by the advertising agent or a providing content selecting unit 24E which selects the content that is the providing target, and executes each processing of the above.

The server of the present invention can be realized by a general computer, without the need for a dedicated server. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the server of the present invention. The above program data may be stored in a disk device or the like included in the server device on the Internet, and embedded in a carrier wave. The program and data embedded in the carrier wave may be downloaded into the computer so as to realize the server of the present invention.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on the Japanese Patent Application No.2002-282699 filed on Sep. 27, 2002, and including specification, claims, drawings and summary. The disclosure of the above Japanese Patent Application is incorporated herein by reference in its entirety.

What is claimed is:

1. A support server that supports a determination of a route for providing content via a communication network from a content providing terminal that provides a content to a content user terminal that is placed in a facility where the content is to be used, comprising:
a receiving unit that receives, from the content providing terminal, facility condition information that shows at least one condition to be met by a facility where the content is to be used and that receives a plurality of facility information, from content user terminals, via the communication network;
a storing unit that stores the facility condition information and the plurality of facility information, received by said receiving unit; and
a providing destination selecting unit that extracts information that specifies a facility, selected based at least on a determination that information included in the stored facility information regarding said facility meets the at least one condition shown by the facility condition information, from the plurality of facility information stored in said storing unit, and selects a content user terminal, placed at the facility specified by the extracted information, as the providing destination of the content.

2. The support server according to claim 1, wherein:
said receiving unit receives, from said content providing terminal, advertising agent condition information that shows at least one condition to be met by an advertising agent from which advertisement of the content is to be requested, and that receives a plurality of advertising agent information from advertising agent terminals managed by advertising agents that advertise contents, said advertising agent information showing an advertisement ability of the advertising agents,
said storing unit stores the advertising agent condition information and the plurality of advertising agent information, which said receiving unit received; and
said support server further comprises an advertising agent selecting unit that extracts information that specifies an advertising agent that meets the at least one condition shown by the advertising agent condition information, from the plurality of advertising agent information stored in the storing unit, and selects the advertising agent specified by the extracted information as the advertising agent from which advertisement of the content is to be requested.

3. The support server according to claim 2, wherein said content is film data used for running a film.

4. A support server that supports a determination of a route for providing a content via a communication network from a content providing terminal that provides a content to a content user terminal that is placed in a facility where the content is to be used, comprising:
a receiving unit that receives a plurality of content information from content providing terminals and that receives content condition information that shows at least one condition to be met by a content that is to be an advertising target of an advertising agent from an advertising agent terminal managed by the advertising agent that advertises a content via the communication network;
a storing unit that stores the plurality of content information and the content condition information, received by said receiving unit; and
an advertisement target content selecting unit that extracts information that specifies a content, selected based at least on a determination that information included in the stored content information regarding said content meets the at least one condition shown by the content condition information, from the plurality of content information stored in said storing unit, and selects the content specified by the extracted information as the content to be advertised by the advertising agent.

5. The support server according to claim 4, wherein:
said receiving unit receives facility condition information from said advertising agent terminal that shows at least one condition to be met by a facility where the advertised content is to be used and that receives a plurality of facility information from content user terminals;
said storing unit stores the facility condition information and the plurality of facility information, which said receiving unit received; and
said support server further comprises a providing destination selecting unit that extracts information that specifies a facility that meets the at least one condition shown by the facility condition information from the plurality of facility information stored in the storing unit, and selects a content user terminal placed at the facility specified by the extracted information as the providing destination of the content that the advertising agent advertises.

6. The support server according to claim 5, wherein said content is film data used for running a film.

7. A support server that supports a determination of a route for providing a content via a communication network from a content providing terminal that provides a content to a content user terminal placed in a facility where the content is to be used, comprising:

a receiving unit that receives a plurality of content information from content providing terminals, and that receives content condition information from said content user terminal that shows at least one condition to be met by a content that is to be a target to be used in the facility via the communication network;

a storing unit that stores the content condition information and the plurality of content information, received by said receiving unit; and a providing content selecting unit that extracts information that specifies a content, selected based at least on a determination that information included in the stored content information regarding said content meets the at least one condition shown by the content condition information, from the plurality of content information stored in said storing unit, and selects the content specified by the extracted information as the content to provide to said content user terminal.

8. The support server according to claim 7, wherein:

said receiving unit receives advertising agent condition information from said content user terminal that shows at least one condition to be met by an advertising agent from which advertisement of said content is to be requested, and that receives a plurality of advertising agent information that show an advertising ability of advertising agents from advertising agent terminals managed by the advertising agents that advertise contents;

said storing unit stores the advertising agent condition information and the plurality of advertising agent information, which said receiving unit received; and said support server further comprises an advertising agent selecting unit that extracts information that specifies a advertising agent that meets the condition shown by the advertising agent condition information from the plurality of advertising agent information stored in the storing unit, and that selects the advertising agent specified by the extracted information as the advertising agent from which advertisement of the content that is to be used in said facility is to be requested.

9. The support server according to claim 8, wherein said content is film data used for running a film.

10. A support method that supports a determination of a route for providing a content via a communication network from a content providing terminal that provides a content to a content user terminal that is placed in a facility where the content is to be used, comprising:

receiving, from said content providing terminal, facility condition information that shows at least one condition to be met by a facility where the content is to be used, and that receives a plurality of facility information, from content user terminals via the communication network;

storing the facility condition information and the plurality of facility information received in said receiving; and extracting information that specifies a facility, selected based at least on a determination that information included in the stored facility information regarding said facility meets the at least one condition shown by the facility condition information, from the plurality of facility information stored in said storing, and selecting a content user terminal, placed in the facility specified by the extracted information, as the providing destination of the content.

11. The support method according to claim 10, wherein:

said receiving comprises receiving, from said content providing terminal, advertising agent condition information that shows at least one condition to be met by an advertising agent from which advertisement of said content is to be requested, and receiving a plurality of advertising agent information that show an advertising ability of advertising agents from advertising agent terminals managed by the advertising agents that advertise contents;

said storing comprises storing the advertising agent condition information and the plurality of advertising agent information, received in said receiving; and said support method further comprises extracting information that specifies an advertising agent that meets the at least one condition shown by the advertising agent condition information, from the plurality of advertising agent information stored in said storing, and selecting the advertising agent specified by the extracted information, as the advertising agent from which advertisement of said content is to be requested.

12. A support method that supports a determination of a route for providing a content via a communication network from a content providing terminal that provides a content to a content user terminal that is placed in a facility where the content is to be used, comprising:

receiving a plurality of content information from said content providing terminals and content condition information that shows at least one condition to be met by a content that is to be the advertising target of an advertising agent from an advertising agent terminal managed by the advertising agent that advertises a content;

storing the plurality of content information and the content condition information, received in said receiving; and extracting information that specifies a content, selected based at least on a determination that information included in the stored content information regarding said content meets the at least one condition shown by the content condition information, from the plurality of content information stored in said storing, and selecting the content specified by the extracted information as the content to be advertised by said advertising agent.

13. The support method according to claim 12, wherein:

said receiving comprises receiving facility condition information that shows at least one condition to be met by a facility where the advertised content is to be used from said advertising agent terminal and a plurality of facility information from content user terminals placed in facilities where a content is to be used;

said storing comprises storing the facility condition information and the plurality of facility information received in said receiving; and said support method further comprises extracting information that specifies a facility that meets the at least one condition shown by the facility condition information from the plurality of facility information stored in said storing, and selecting a content user terminal placed in the facility specified by the extracted information as the providing destination of the content that is to be advertised by said advertising agent.

14. A support method that supports a determination of a route for providing a content via a communication network from a content providing terminal that provides a content to a content user terminal placed in a facility where the content is to be used, comprising:

receiving a plurality of content information from content providing terminals and content condition information that shows at least one condition to be met by a content that is a target to be used in the facility from said content user terminal via said communication network;

storing the plurality of content information and the content condition information received in said receiving; and extracting information that specifies a content, selected based at least on a determination that information included in the stored content information regarding said content meets the at least one condition shown by the content condition information, from the plurality of content information stored in said storing, and selecting the content specified by the extracted information as the content to be provided to said content user terminal.

15. The support method according to claim 14, wherein:

said receiving comprises receiving, from said content user terminal, advertising agent condition information that shows at least one condition to be met by an advertising agent from which advertisement of the content is to be requested, and receiving advertising agent information showing an advertisement ability of advertising agents from advertising agent terminals managed by the advertising agents that advertise contents;

said storing comprises storing the advertising agent condition information and the plurality of advertising agent information received in said receiving; and said support method further comprises extracting information that specifies a advertising agent that meets the at least one condition shown by the advertising agent condition information from the plurality of advertising agent information stored in said storing, and selecting the advertising agent specified by the extracted information as the advertising agent from which advertisement of the content that is to be used in said facility is to be requested.

16. A computer readable storage medium having computer instructions for enabling a computer executing the computer instructions to perform a support method that supports a determination of a route for providing a content via a communication network from a content providing terminal that provides a content to a content user terminal that is placed in a facility where the content is to be used, said method comprising:

receiving, from said content providing terminal, facility condition information that shows at least one condition to be met by a facility where said content is to be used, and receiving a plurality of facility information provided by said content user terminals via said communication network;

storing the facility condition information and the plurality of facility information received in said receiving; and extracting information that specifies a facility, selected based at least on a determination that information included in tile stored facility information regarding said facility meets the at least one condition shown by the facility condition information, from the plurality of facility information stored in said storing, and selecting a content user terminal placed in the facility specified by the extracted information as the providing destination of said content.

17. A computer readable storage medium having computer instructions for enabling a computer executing the computer instructions to perform a support method that supports a determination of a route for providing a content via a communication network from a content providing terminal that provides a content to a content user terminal that is placed in a facility where the content is to be used, said method comprising:

receiving a plurality of content information from content providing terminals and receiving, from an advertising agent terminal managed by an advertising agent, content condition information that shows at least one condition to be met by a content that is to be the advertising target of the advertising agent that advertises content;

storing said plurality of content information and said content condition information received in said receiving; and extracting information that specifies a content, selected based at least on a determination that information included in the stored content information regarding said content meets the at least one condition shown by said content condition information, from said plurality of content information stored in said storing, and selecting the content specified by the extracted content information as the content that is to be advertised by said advertising agent.

18. A computer readable storage medium having computer instructions for enabling a computer executing the computer instructions to perform a support method that supports a determination of a route for providing a content via a communication network from a content providing terminal that provides a content to a content user terminal that is placed in a facility where the content is to be used, said method comprising:

receiving a plurality of content information from content providing terminals and receiving, from said content user terminal of said facility, content condition information that shows at least one condition to be met by a content that is to be a target to be used in the facility via said communication network;

storing the plurality of content information and said content condition information received in said receiving; and extracting information that specifies a content, selected based at least on a determination that information included in the stored content information regarding said content that meets the at least one condition shown by the content condition information, from the plurality of content information stored in said storing, and selecting the content specified by the extracted content information as the content to be provided to said content user terminal.

19. A support server that determines a route for distributing content via a communication network from a content provider that provides a content to a content user terminal placed in a facility where the content is to be used, comprising:

a receiving unit that receives, from a content provider, facility prerequisite data that specifies at least one prerequisite to be met by a facility where the content is to be used and that receives facility data from a plurality of content users of facilities;

a storing unit that stores the received facility prerequisite data and the received facility data; and a destination selecting unit that selects a facility based at least on a determination that information included in the stored facility data regarding the facility meets the at least one prerequisite specified by the stored facility prerequisite data, and that selects, based on information extracted from the stored facility data of the selected facility, a content user terminal placed at the selected facility as the destination of the content.

20. A support server that determines a route for distributing content via a communication network from a content provider that provides a content to a content user terminal placed in a facility where the content is to be used, comprising:

a receiving unit that receives, from an advertising agent, content prerequisite data that specifies at least one prerequisite to be met by a content that is to be an advertising target of the advertising agent and that receives content data from a plurality of content providers;

a storing unit that stores the received content prerequisite data and the received content data; and an advertisement target selecting unit that selects a content, based at least on a determination that information included in the stored content data regarding the content meets the at least one prerequisite specified by the content prerequisite data, as the content to be advertised by the advertising agent.

21. A support server that determines a route for distributing content via a communication network from a content provider that provides a content to a content user terminal placed in a facility where the content is to be used, comprising:

a receiving unit that receives content data from a plurality of content providers and that receives content prerequisite data from a content user of a facility that specifies at least one prerequisite to be met by a content that is to be used in the facility;

a storing unit that stores the received content data and the received content prerequisite data; and a content selecting unit that selects a content, based at least on a determination that information included in said stored content data regarding the content meets the at least one prerequisite specified by the content prerequisite data, as the content to provide to a content user terminal of the facility of the content user.

\* \* \* \* \*